United States Patent
Alameh et al.

(10) Patent No.: US 11,562,051 B2
(45) Date of Patent: Jan. 24, 2023

(54) VARYING COMPUTING DEVICE BEHAVIOR FOR DIFFERENT AUTHENTICATORS

(71) Applicant: Motorola Mobility LLC, Chicago, IL (US)

(72) Inventors: Rachid M. Alameh, Crystal Lake, IL (US); Jarrett K. Simerson, Glenview, IL (US); John J. Gorsica, IV, Round Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 366 days.

(21) Appl. No.: 16/394,307

(22) Filed: Apr. 25, 2019

(65) Prior Publication Data

US 2020/0342076 A1    Oct. 29, 2020

(51) Int. Cl.
*G06F 21/00*   (2013.01)
*G06F 21/31*   (2013.01)

(52) U.S. Cl.
CPC .................................... *G06F 21/31* (2013.01)

(58) Field of Classification Search
CPC .. G06F 21/31; G06F 2221/2149; G06F 21/32; G06F 21/34; H04W 12/06; H04W 12/63; H04W 12/33; H04W 12/37; H04W 12/08; H04L 63/107
See application file for complete search history.

(56) References Cited

U.S. PATENT DOCUMENTS

| | | | |
|---|---|---|---|
| 9,092,969 B2 | 7/2015 | McCown et al. | |
| 9,355,231 B2 | 5/2016 | Disraeli | |
| 10,380,425 B2 | 8/2019 | Wexler et al. | |
| 10,386,960 B1 | 8/2019 | Smith | |
| 10,701,067 B1 | 6/2020 | Ziraknejad et al. | |

(Continued)

FOREIGN PATENT DOCUMENTS

| | | |
|---|---|---|
| EP | 3291167 | 7/2018 |
| EP | 2992692 | 8/2018 |

OTHER PUBLICATIONS

"Final Office Action", U.S. Appl. No. 16/394,264, dated Mar. 18, 2021, 44 pages.

(Continued)

*Primary Examiner* — Yogesh Paliwal
(74) *Attorney, Agent, or Firm* — FIG. 1 Patents

(57) ABSTRACT

A computing device supports the use of multiple different authenticators for a user to unlock his or her computing device and access his or her user account. An authenticator refers to something that the user knows or has that can be compared to known authentication data in order to authenticate the user. In one or more embodiments, the behavior of the computing device varies for different authenticators by displaying user-selectable content in different visibility modes based on which authenticator is used to authenticate the user. In one content visibility mode content is fully visible on the computing device display screen, whereas in another content visibility mode content visibility on the computing device display screen is reduced. Additionally or alternatively, the behavior of the computing device varies for different authenticators by using different authenticators for different contexts of the computing device.

20 Claims, 12 Drawing Sheets

(56) References Cited

U.S. PATENT DOCUMENTS

| | | | |
|---|---|---|---|
| 10,963,586 B1 | 3/2021 | Sculley et al. | |
| 11,455,411 B2 | 9/2022 | Alameh et al. | |
| 2005/0221798 A1 | 10/2005 | Sengupta et al. | |
| 2007/0067738 A1 | 3/2007 | Flynt et al. | |
| 2008/0186162 A1 | 8/2008 | Rajan et al. | |
| 2011/0214158 A1* | 9/2011 | Pasquero | H04B 5/00 726/2 |
| 2013/0225309 A1 | 8/2013 | Bentley et al. | |
| 2013/0254401 A1 | 9/2013 | Marshall et al. | |
| 2014/0033326 A1 | 1/2014 | Chien | |
| 2014/0129231 A1* | 5/2014 | Herring | G10L 25/51 704/270.1 |
| 2015/0070461 A1* | 3/2015 | Nace | H04M 1/72412 348/14.08 |
| 2015/0161701 A1 | 6/2015 | Bretscher et al. | |
| 2015/0178822 A1 | 6/2015 | Babiarz et al. | |
| 2015/0288719 A1 | 10/2015 | Freudiger et al. | |
| 2015/0310434 A1 | 10/2015 | Cheung | |
| 2015/0370323 A1 | 12/2015 | Cieplinski et al. | |
| 2015/0373050 A1 | 12/2015 | Dayan et al. | |
| 2015/0381633 A1* | 12/2015 | Grim | H04L 63/08 726/4 |
| 2016/0011767 A1 | 1/2016 | Jung et al. | |
| 2016/0050209 A1* | 2/2016 | Govande | H04W 12/06 726/7 |
| 2016/0055324 A1* | 2/2016 | Agarwal | G06F 21/31 726/17 |
| 2016/0164865 A1 | 6/2016 | Speicher et al. | |
| 2016/0224779 A1 | 8/2016 | Kitane et al. | |
| 2016/0253141 A1 | 9/2016 | Sarkar et al. | |
| 2016/0255068 A1* | 9/2016 | Pritchard | G06F 21/35 726/7 |
| 2016/0378302 A1 | 12/2016 | Gilger et al. | |
| 2017/0041789 A1 | 2/2017 | Waldron et al. | |
| 2017/0116846 A1 | 4/2017 | Wengrovitz et al. | |
| 2017/0193303 A1 | 7/2017 | Wexler et al. | |
| 2018/0137681 A1 | 5/2018 | Chang et al. | |
| 2018/0217966 A1 | 8/2018 | Buttolo et al. | |
| 2018/0350144 A1 | 12/2018 | Rathod | |
| 2019/0089831 A1* | 3/2019 | Medlen | G10L 15/26 |
| 2019/0171806 A1 | 6/2019 | Embrechts et al. | |
| 2019/0182670 A1 | 6/2019 | Maragoudakis | |
| 2019/0205010 A1 | 7/2019 | Fujii et al. | |
| 2019/0243989 A1 | 8/2019 | Kalva et al. | |
| 2019/0286298 A1 | 9/2019 | Wantland et al. | |
| 2019/0373472 A1 | 12/2019 | Smith et al. | |
| 2020/0285752 A1 | 9/2020 | Wyatt et al. | |
| 2020/0304445 A1 | 9/2020 | Dinhthi et al. | |
| 2020/0342133 A1 | 10/2020 | Alameh et al. | |
| 2020/0342144 A1 | 10/2020 | Alameh et al. | |
| 2020/0344213 A1 | 10/2020 | Gorsica et al. | |
| 2021/0320904 A1 | 10/2021 | Gorsica et al. | |

OTHER PUBLICATIONS

"Notice of Allowance", U.S. Appl. No. 16/394,327, dated Apr. 14, 2021, 13 pages.

"Notice of Allowance", U.S. Appl. No. 16/394,264, dated Apr. 23, 2021, 20 pages.

"Android Developers—Docs—Guides—VPN", Retrieved at: https://developer.android.com/guide/topics/connectivity/vpn—on Mar. 20, 2019, 12 pages.

"Locly Native App Platform", Retrieved at: https://locly.com/—on Apr. 19, 2019, 15 pages.

"Lock your Windows 10 PC automatically when you step away from it", Retrieved at: https://support.microsoft.com/en-us/help/4028111/windows-lock-your-windows-10-pc-automatically-when-you-step-away-from—on Apr. 19, 2019, 2 pages.

Sprager,"Inertial Sensor-Based Gait Recognition: A Review", Sep. 2, 2015, pp. 22090-22127.

"Non-Final Office Action", U.S. Appl. No. 16/394,327, dated Nov. 24, 2020, 18 pages.

"Non-Final Office Action", U.S. Appl. No. 16/394,264, dated Oct. 5, 2020, 46 pages.

"Corrected Notice of Allowability", U.S. Appl. No. 16/394,327, dated Jul. 6, 2021, 2 pages.

"Non-Final Office Action", U.S. Appl. No. 16/394,290, dated Jul. 6, 2021, 9 pages.

"Supplemental Notice of Allowability", U.S. Appl. No. 16/394,264, dated Jul. 22, 2021, 3 pages.

"Final Office Action", U.S. Appl. No. 16/394,290, dated Mar. 1, 2022, 11 pages.

U.S. Appl. No. 16/394,290 , "Notice of Allowance", U.S. Appl. No. 16/394,290, dated Jun. 17, 2022, 7 pages.

U.S. Appl. No. 16/394,290 , "Supplemental Notice of Allowability", U.S. Appl. No. 16/394,290, dated Aug. 31, 2022, 4 pages.

\* cited by examiner

VARYING COMPUTING DEVICE BEHAVIOR FOR DIFFERENT AUTHENTICATORS

BACKGROUND

As technology has advanced, computing devices have become increasingly commonplace in our lives. For example, many people have mobile devices such as phones or tablets that they carry with them and use throughout the day. While these devices have provided many benefits to our lives, they are not without their problems. One such problem is that oftentimes people keep confidential information or applications on the device that they do not want another person to see or have access to. For example, a user may be in a crowded location where other people can see what is displayed on his device when he unlocks it. Some devices do support multiple user accounts, but switching between user accounts can be cumbersome, and some devices (e.g., many mobile phones) do not support multiple user accounts. These difficulties in using their devices can be frustrating for users, resulting in user dissatisfaction with their devices.

BRIEF DESCRIPTION OF THE DRAWINGS

Embodiments of varying computing device behavior for different authenticators are described with reference to the following drawings. The same numbers are used throughout the drawings to reference like features and components.

DETAILED DESCRIPTION

Figure 1:
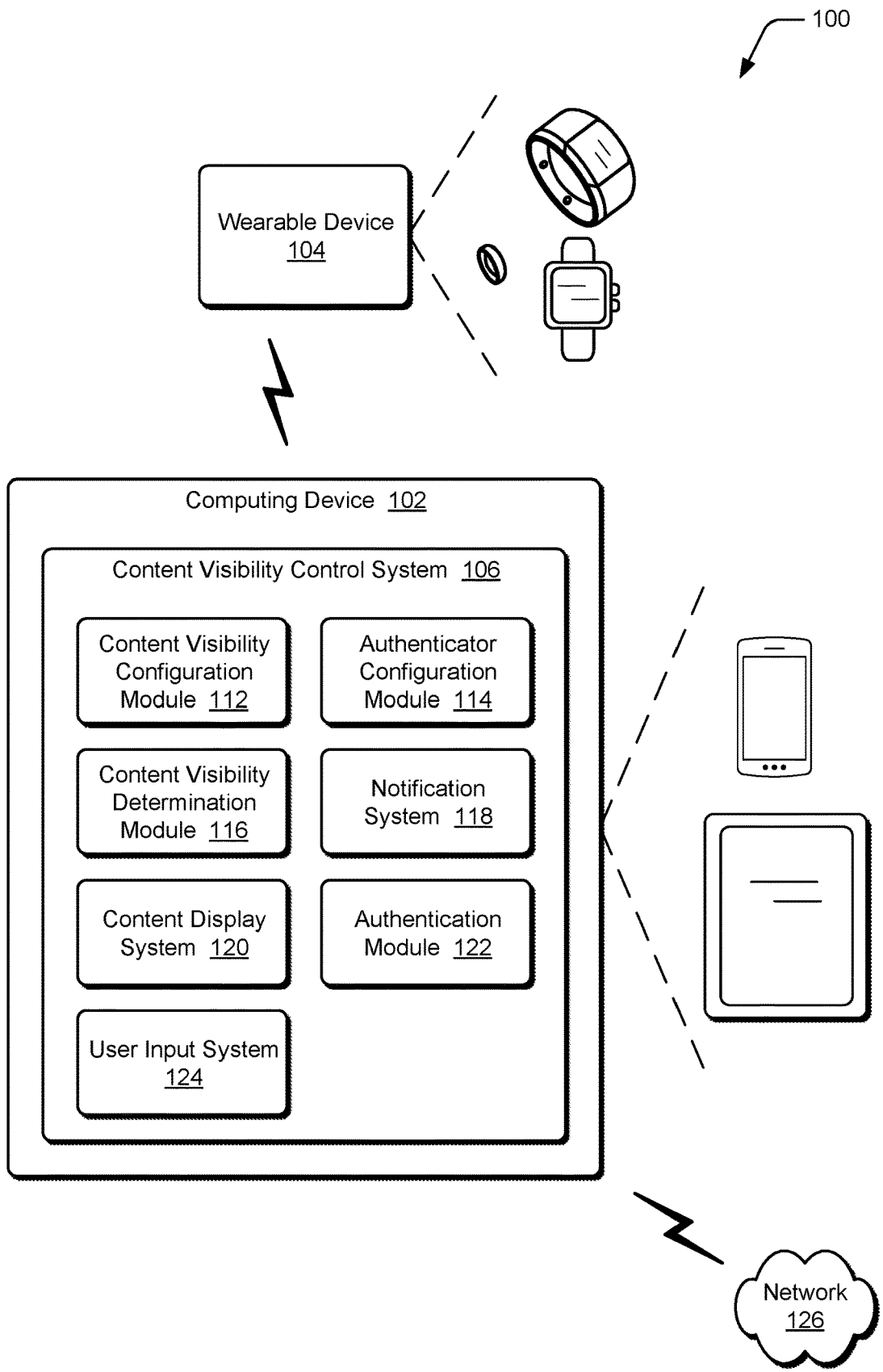
FIG. 1 illustrates an example environment in which the techniques discussed herein can be used.

Varying computing device behavior for different authenticators is discussed herein. A computing device supports the use of multiple different authenticators for a user to unlock his or her computing device and access his or her user account on the computing device. An authenticator refers to something that the user knows or has that can be compared to known authentication data in order to verify that the user is who he or she claims to be (also referred to as authenticating the user). Examples of authenticators include passwords, personal identification numbers (PINs), fingerprints, facial features, iris features, voice features, and so forth. The behavior of the computing device varies for different authenticators.

Unlocking a computing device refers to allowing a user to use his or her user account on the computing device. The behavior of the computing device varies for different authenticators, but the user account that is being used remains the same. Thus, in contrast to a computing device having multiple user accounts that are accessed with different authenticators, the techniques discussed herein access a single user account with different authenticators.

In one or more embodiments, the behavior of the computing device varies for different authenticators by displaying user-selectable content in different visibility modes based on which authenticator is used to authenticate the user. The computing device supports a full content visibility mode and at least one reduced content visibility mode. In the full content visibility mode content is fully visible on the computing device display screen. Content being fully visible on the computing device display screen includes all user-selectable content on the computing device being displayed on the display screen of the computing device. It should be noted that not all user-selectable content may be displayed concurrently. Rather, the user may access different pages displaying different user-selectable content.

In the reduced content visibility mode content visibility on the computing device display screen is reduced. Content visibility can be reduced in various manners, such as by limiting which applications (e.g., application icons or widgets) are displayed or accessible/unlocked to the user. The content that is accessible (e.g., displayed) in the reduced content visibility mode is also referred to as a reduced subset of the user-selectable content. It should be noted that not all content in the reduced subset of user-selectable content may be displayed concurrently. Rather, the user may access different pages displaying different content in the reduced subset of user-selectable content.

The computing device is unlocked in response to an authentication input that authenticates the user. The authentication input is one of multiple authenticators. The computing device is unlocked and operates in the full content visibility mode in response to the authentication input being one authenticator. However, the computing device is unlocked and operates in a reduced content visibility mode in response to the authentication input being a different authenticator.

Additionally or alternatively, the behavior of the computing device varies for different authenticators by using different authenticators for different contexts of the computing device. The context of the computing device can take various forms, such as a current location of the computing device or a proximity of a wearable device that is associated with the computing device (e.g., paired using Bluetooth pairing) to the computing device. The computing device uses different authenticators for different contexts, such as by using a first password if the wearable device is in close proximity to the computing device, and using a second password if the wearable device is not in close proximity to the computing device.

The techniques discussed herein enhance the security of a computing device, assuring the owner of the computing device that content the owner does not want others to see or access will not be accessible to other users with which the owner is sharing the computing device or that can see the display screen of the computing device. This enhanced security is provided without the need for separate user accounts on the computing device, allowing the user to access his or her account using different authenticators in order to access different content visibility modes of the computing device. The owner can specify which content is in the reduced subset of user-selectable content, allowing the user to control which user-selectable content is visible for each different authenticator.

This enhanced security is also provided by the user allowing different authenticators to be specified for different contexts. For example, the user can specify a short PIN authenticator for a private setting context (e.g., the user is at home) and a longer password authenticator or a fingerprint authenticator for a public setting context (e.g., the user is at the airport).

FIG. 1 illustrates an example environment 100 in which the techniques discussed herein can be used. The environment 100 includes a computing device 102 and a wearable device 104. The computing device 102 can be, or include, many different types of computing or electronic devices. For example, the computing device 102 can be a mobile device designed to be easily carried by a user, such as a smartphone or other wireless phone, a notebook computer (e.g., netbook or ultrabook), a laptop computer, an augmented reality headset or device, a virtual reality headset or device, a tablet or phablet computer, an entertainment device (e.g., a gaming console, a portable gaming device, a streaming media player, a digital video recorder, a music or other audio playback device), and so forth. By way of further example, the computing device 102 can be a device designed to be more stationary than mobile, such as a desktop computer, a television, a television set-top box, and so forth.

The wearable device 104 can be, or include, many different types of portable computing or electronic devices. The wearable device 104 is a device designed to be worn by a user or regularly carried by a user. For example, the wearable device 104 can be a smartwatch, an augmented reality headset or device, a virtual reality headset or device, jewelry (e.g., a ring, a bracelet, a necklace), a fitness tracker, a key fob, and so forth. E.g., the computing device 102 can be a smartphone and the wearable device 104 can be a smartwatch. By way of further example, the wearable device 104 can be a mobile device, particularly in situations where the computing device 102 is a stationary device. E.g., the computing device 102 can be a desktop computer and the wearable device 104 can be a smartphone.

The computing device 102 includes a content visibility control system 106. The content visibility control system 106 controls content visibility on a display screen of the computing device 102. The content visibility control system 106 includes a content visibility configuration module 112, an authenticator configuration module 114, a content visibility determination module 116, a notification system 118, a content display system 120, an authentication module 122, and a user input system 124.

The content visibility configuration module 112 configures the reduced content visibility mode. In one or more implementations, the content visibility configuration module 112 facilitates user selection of which content on the computing device 102 is not to be visible in a reduced content visibility mode. The authenticator configuration module 114 configures the different authenticators. In one or more implementations, the authenticator configuration module 114 facilitates user selection of which authenticator to use in which context. Additionally or alternatively, the authenticator configuration module 114 facilitates user selection of which of multiple content visibility modes correspond to which of multiple authenticators. In one or more embodiments, the content visibility determination module 116 determines a context for the computing device 102.

The notification system 118 provides various alerts, updates, and other notifications to the user of the computing device 102. The content display system 120 manages the display of content on the display screen of the computing device 102. The authentication module 122 authenticates a user of the computing device 102 using one of multiple authenticators, such as a password, a personal identification number (PIN), passcode, a fingerprint scan, a face scan, a user's gait or posture measured by motion sensors worn or carried by the user, and so forth. The user input system 124 receives inputs of a user, such as gesture inputs via a touchscreen, touching or tapping inputs via a touchscreen, text inputs, audio inputs, and so forth.

The wearable device 104 is associated with the computing device 102. In one or more embodiments, the wearable device 104 is associated with the computing device 102 by pairing the wearable device 104 with the computing device 102 (e.g., using Bluetooth pairing). Additionally or alternatively, this association can be made in other manners. For example, the owner of the wearable device 104 and the computing device 102 can manually input to the computing device 102 an identifier of the wearable device 104, and manually input to the wearable device 104 an identifier of the computing device 102. Associating the wearable device 104 with the computing device 102 allows the computing device 102 to use the proximity of the wearable device 104 as context for selecting an authenticator, as discussed in more detail below.

The wearable device 104 can also be associated with a particular user of the computing device 102. This association can be implicit. For example, when the wearable device 104 is associated with the computing device 102, the user is logged into the computing device 102 (e.g., using his or her name and password, using a scanned fingerprint, using a PIN). The user logged into the computing device 102 when the wearable device 104 was paired with the computing device 102 is the user associated with the wearable device 104. The computing device 102 can, for example, pass an identifier of the user to the wearable device 104.

Additionally or alternatively, this association of the wearable device 104 with a particular user of the computing device 102 can also be explicit. For example the user can authenticate himself or herself to both the wearable device 104 and the computing device 102 (e.g., using his or her name and password, using a scanned fingerprint, using a PIN). The wearable device 104 and the computing device 102 can then communicate with each other and verify that the same user (e.g., same user identifier) has authenticated himself or herself to both the wearable device 104 and the computing device 102.

The computing device 102 can operate in different content visibility modes, including a full content visibility mode and a reduced content visibility mode. In the full content visibility mode content is fully visible and accessible on the display screen of the computing device 102, typically across multiple different pages. Content being fully visible on the computing device screen includes all user-selectable content on the computing device 102 being displayed on a display screen of the computing device 102. User-selectable content refers to content that a user can select to activate or display (e.g., run applications, display images, call phone numbers), as well as settings or preferences for the computing device 102 that a user can select (e.g., background images, wallpapers, lock screen images) and notifications, alerts, and updates associated with content that a user can select to activate or display (e.g., meeting notifications, text message alerts, availability of a new version of an application). User-selectable content also refers to user selectable setting controls, such as setting controls for enabling/disabling wireless links, setting controls for security, setting controls for adding/removing accounts, and so forth.

In the reduced content visibility mode content visibility on the display screen of the computing device 102 is reduced. Content visibility being reduced refers to content not being accessible to the user, such as not being fully visible on the computing device screen, being blurred or scrambled on the device screen, or being visible but otherwise not accessible (e.g., locked). Whether the computing device 102 is to operate in the full content visibility mode or a reduced content visibility mode can be determined in different manners, such as by the user authenticating himself or herself using different authenticators.

Figure 2:
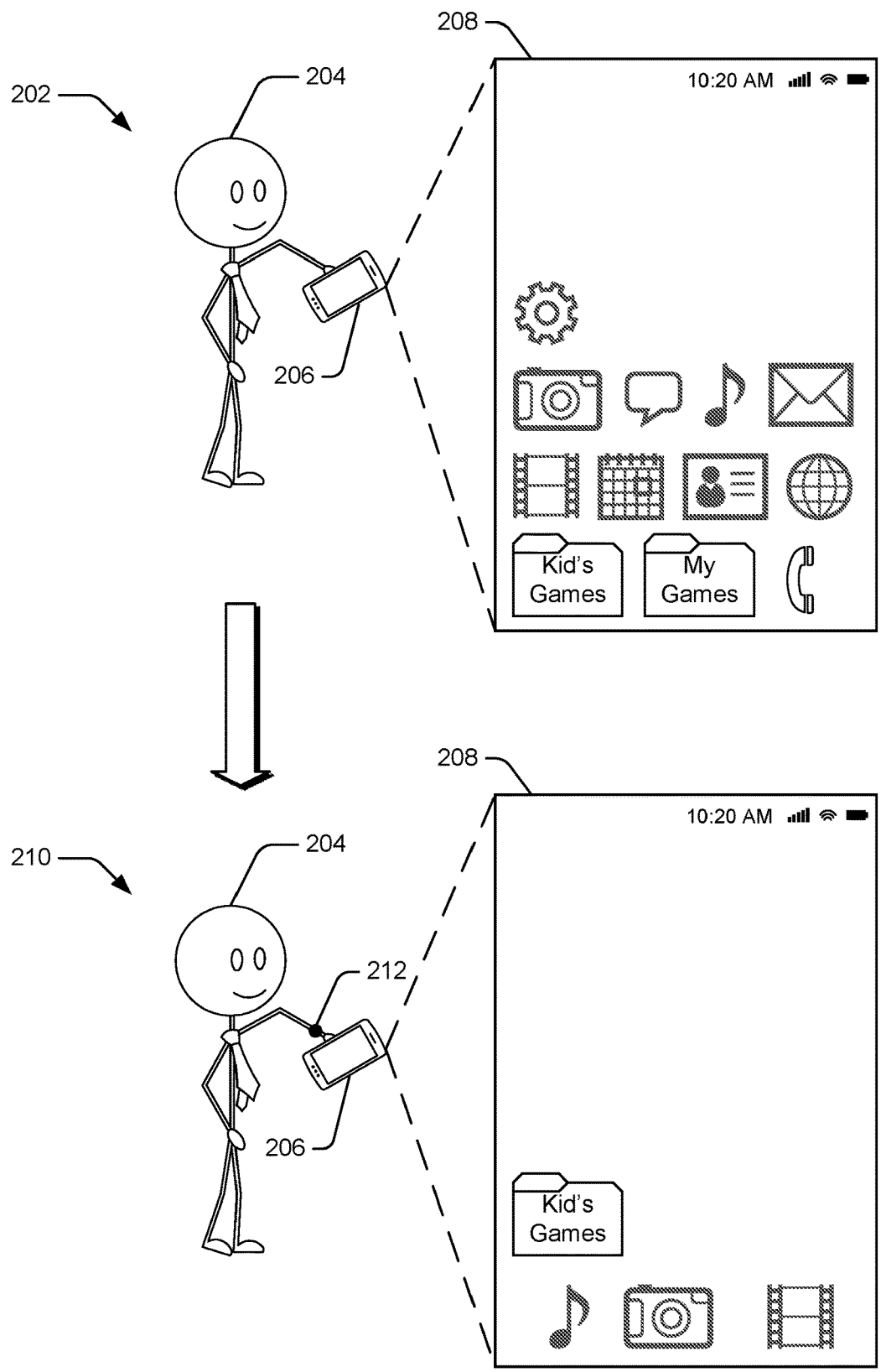
FIGS. 2, 3, and 4 illustrate example operations of the techniques discussed herein.

FIG. 2 illustrates an example operation of the techniques discussed herein. At 202 a user 204 is illustrated. The user 204 has a computing device 206 illustrated as a smartphone. At 202 the context of the computing device 206 is that a wearable device is not in close proximity to the computing device 206, and a first authenticator corresponds to that context. The user 204 provides the first authenticator to the computing device 206 to unlock the computing device 206, causing the computing device 206 to operate in a full content visibility mode. As illustrated by display screen 208, in the full content visibility mode all user-selectable content on the computing device 206 is visible on the display screen 208. The user-selectable content is illustrated as two folders labelled "Kid's Games" and "My Games", as well as several icons that represent applications or operating system programs that can be selected by the user 204 for execution. For example, a gear icon represents a settings program, a camera icon represents an image capture program, a speech balloon icon represents a texting application, a music note icon represents a music playback program, an envelope icon represents an email application, a film strip icon represents a video playback program, a calendar icon represents a calendaring program, a business card icon represents a contact list program, a globe icon represents a web browser, and a telephone handset icon represents a telephone communication program.

At 210 the user is illustrated at a later time than at 202. At 210 the user 204 is wearing a wearable device 212 illustrated as a smartwatch, and has a computing device 206 illustrated as a smartphone. Accordingly, at 210 the context of the computing device 206 is that a wearable device is in close proximity to the computing device 206, and a second authenticator corresponds to that context. The user 204 provides the second authenticator to the computing device 206 to unlock the computing device 206, causing the computing device 206 to operate in a reduced content visibility mode. As illustrated by display screen 208, in the reduced content visibility mode a reduced subset of user-selectable content is visible on the display screen 208. The user-selectable content is illustrated as a folder labelled "Kid's Games" as well as a music note icon that represents a music playback program, a camera icon that represents an image capture program, and a film strip icon that represents a video playback program. Icons representing several programs that are not user-selectable content in the reduced content visibility mode are not displayed. For example, compared to the display screen 208, the gear icon, the speech balloon icon, the envelope icon, the calendar icon, the business card icon, the globe icon, and the telephone handset icon are not displayed. Without these icons being displayed, the user 204 is unable to select these icons and run the settings program, the texting application, the email application, the calendaring program, the contact list program, the web browser, and the telephone communication program, respectively.

Note that if the user had provided the second authenticator at 202 the computing device 206 would not be unlocked because the second authenticator does not correspond to the context of a wearable device not being in close proximity to the computing device 206. Similarly, if the user had provided the first authenticator at 210 the computing device 206 would not be unlocked because the first authenticator does not correspond to the context of a wearable device being in close proximity to the computing device 206.

Figure 3:
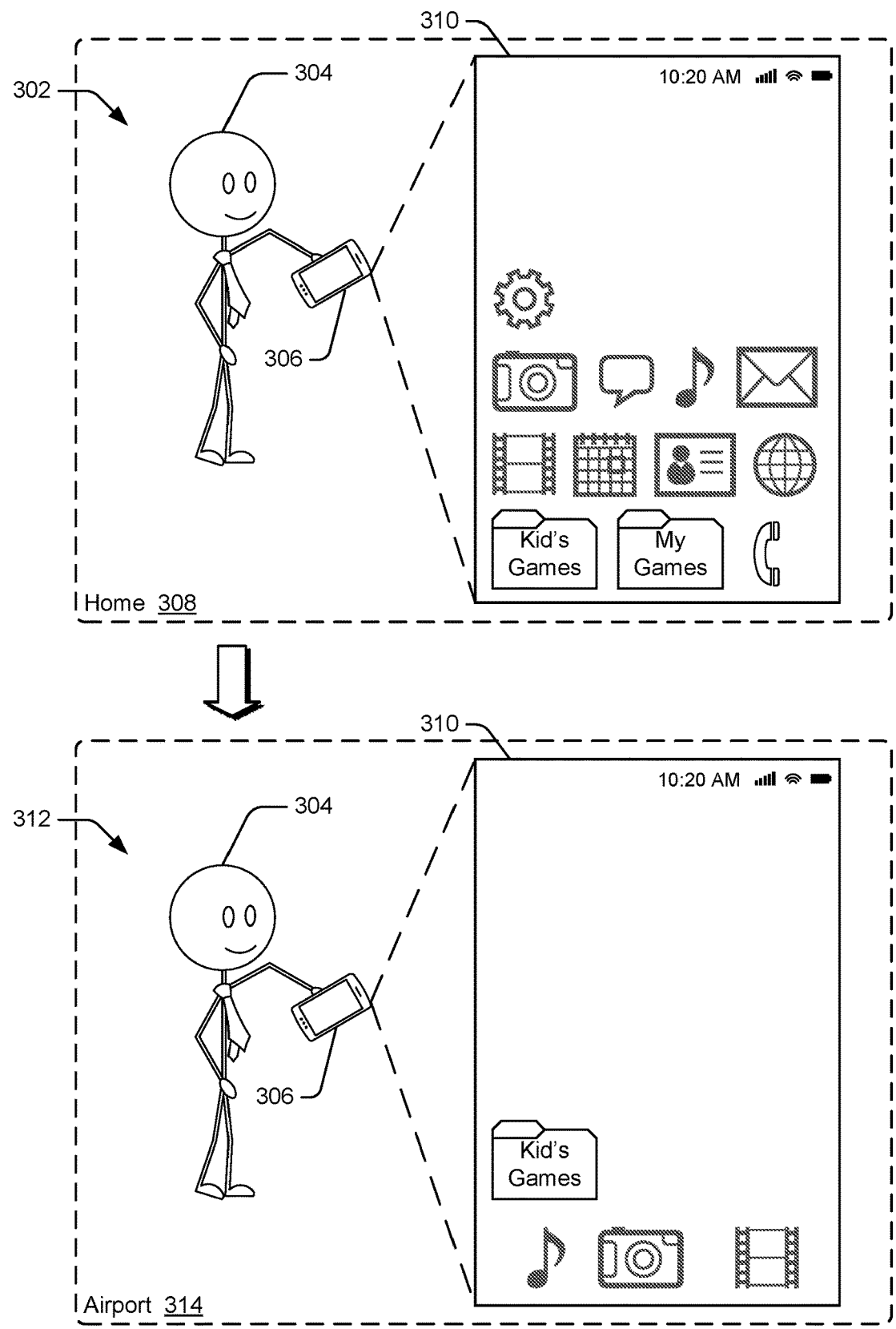

FIG. 3 illustrates another example operation of the techniques discussed herein. At 302 a user 304 is illustrated. The user 304 has a computing device 306 illustrated as a smartphone. At 302 the context of the computing device 306 is that the user 304 is in a private setting (e.g., at home 308), and a first authenticator (e.g., a short password, a short voice phrase, a thumb fingerprint) corresponds to that context. The user 304 provides the first authenticator to the computing device 306 to unlock the computing device 306, causing the computing device 306 to operate in a full content visibility mode. As illustrated by display screen 310, in the full content visibility mode all user-selectable content on the computing device 306 is visible on the display screen 310. The user-selectable content is illustrated as two folders labelled "Kid's Games" and "My Games", as well as several icons that represent applications or operating system programs that can be selected by the user 304 for execution. For example, a gear icon represents a settings program, a camera icon represents an image capture program, a speech balloon icon represents a texting application, a music note icon represents a music playback program, an envelope icon represents an email application, a film strip icon represents a video playback program, a calendar icon represents a calendaring program, a business card icon represents a contact list program, a globe icon represents a web browser, and a telephone handset icon represents a telephone communication program.

At 312 the user is illustrated at a later time than at 302. At 312 the user 304 is no longer at home but is at the airport 314. Accordingly, at 312 the context of the computing device 306 is that the user 304 is in a public setting (e.g., at the airport 314), and a second authenticator (e.g., a long password, a long voice phrase, a thumb fingerprint) corresponds to that context. The user 304 provides the second authenticator to the computing device 306 to unlock the computing device 306, causing the computing device 306 to operate in a reduced content visibility mode. As illustrated by display screen 310, in the reduced content visibility mode a reduced subset of user-selectable content is visible on the display screen 310. The user-selectable content is illustrated as a folder labelled "Kid's Games" as well as a music note icon that represents a music playback program, a camera icon that represents an image capture program, and a film strip icon that represents a video playback program. Icons representing several programs that are not user-selectable content in the reduced content visibility mode are not displayed. For example, compared to the display screen 310, the gear icon, the speech balloon icon, the envelope icon, the calendar icon, the business card icon, the globe icon, and the telephone handset icon are not displayed. Without these icons being displayed, the user 304 is unable to select these icons and run the settings program, the texting application, the email application, the calendaring program, the contact list program, the web browser, and the telephone communication program, respectively.

Note that if the user had provided the second authenticator at 302 the computing device 306 would not be unlocked because the second authenticator does not correspond to the context of the user 304 being in a private setting. Similarly, if the user had provided the first authenticator at 312 the computing device 306 would not be unlocked because the first authenticator does not correspond to the context of the user 304 being in a public setting.

Figure 4:
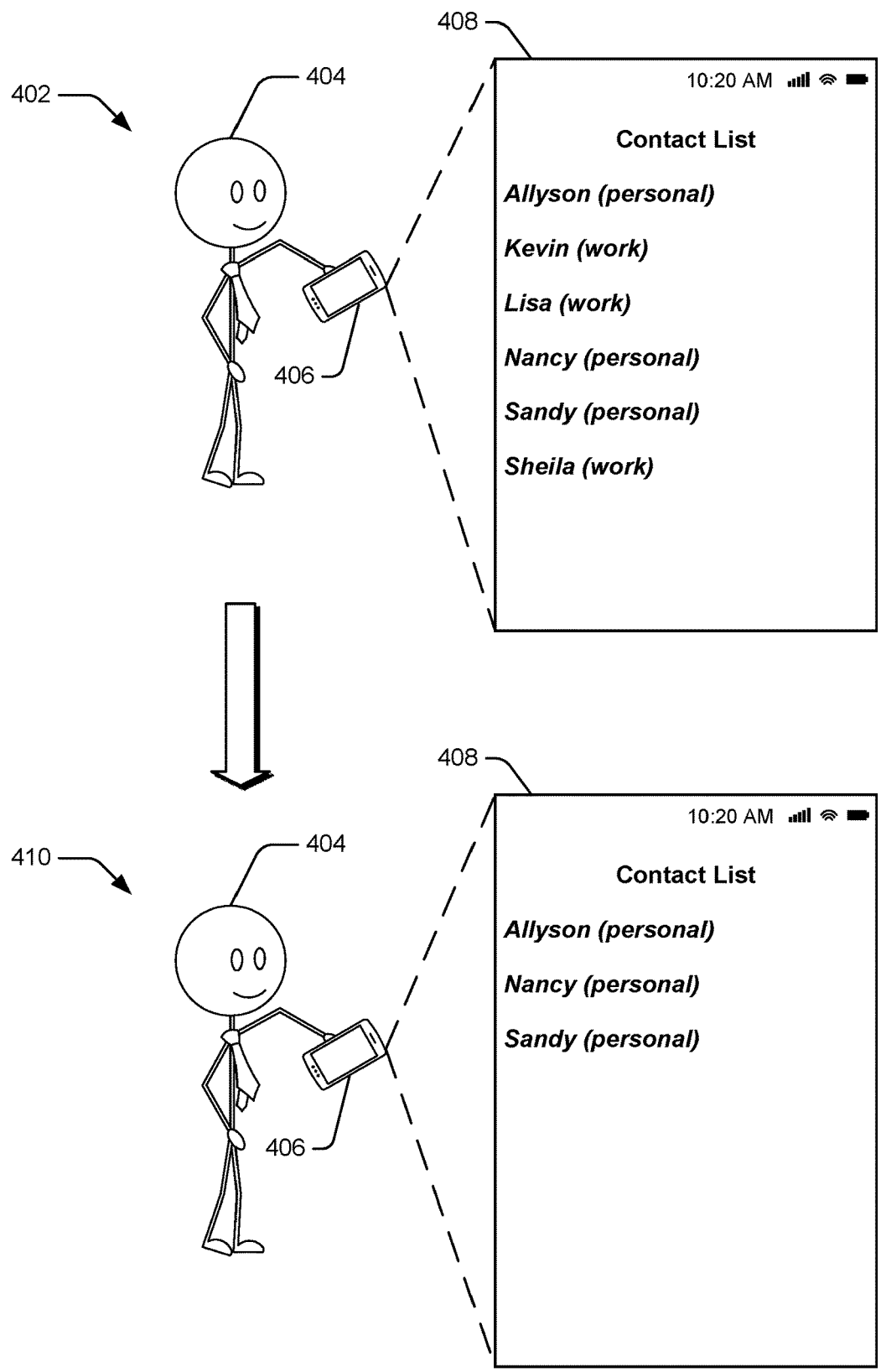

FIG. 4 illustrates another example operation of the techniques discussed herein. At 402 a user 404 is illustrated. The user 404 has a computing device 406 illustrated as a smartphone. The user 404 provides a first authenticator (e.g., a first password, a long voice phrase, a thumb fingerprint) to the computing device 406 to unlock the computing device 406, causing the computing device 406 to operate in a full content visibility mode. As illustrated by display screen 408, in the full content visibility mode all user-selectable content on the computing device is visible on the display screen 408. The user-selectable content is illustrated as a contacts list and an individual's name can be selected by the user to display various contact information regarding the individual (e.g., phone numbers, email addresses, mailing addresses), to contact an individual (e.g., call a phone number, send a text message). The contacts list includes various names and an indication of whether the individual is a personal or work contact.

At 410 the user is illustrated at a later time than at 402. At 410 the user 404 provides a second authenticator (e.g., a second password, a short voice phrase, an index finger fingerprint) to the computing device 406 to unlock the computing device 406, causing the computing device 406 to operate in a full content visibility mode. As illustrated by display screen 408, in the reduced content visibility mode a reduced subset of user-selectable content is visible on the display screen 408. The user-selectable content is illustrated as a contacts list that includes only personal contacts, not work contacts. Without these contacts being displayed, the user 404 is unable to select these contacts and obtain contact information for, or contact, the work contacts.

Figure 5:
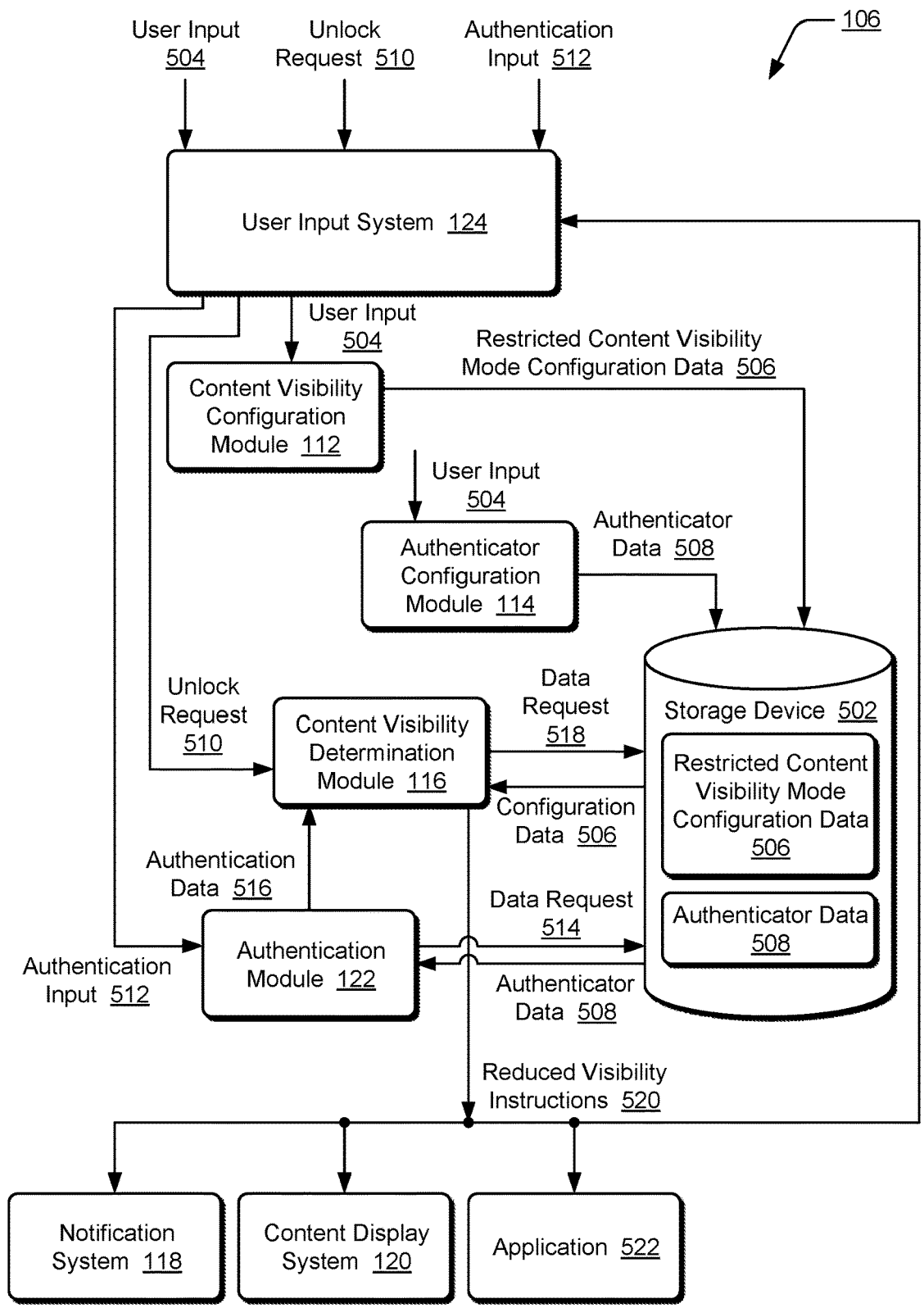
FIG. 5 illustrates an example of components of the content visibility control system in additional detail.

FIG. 5 illustrates an example of components of the content visibility control system 106 in additional detail. The content visibility control system 106 includes the content visibility configuration module 112, the authenticator configuration module 114, the content visibility determination module 116, the notification system 118, the content display system 120, the authentication module 122, the user input system 124, and a storage device 502. The storage device 502 can be any of a variety of different storage devices or components, such as random access memory (RAM), Flash memory, magnetic disk, and so forth.

The user input system 124 receives inputs of a user to the computing device 102. These inputs can take any of a variety of forms, such as gesture inputs to a touchscreen, touching or tapping inputs to a touchscreen, text inputs to a touchscreen or keypad, audible inputs, cursor control inputs, and so forth.

The content visibility configuration module 112 configures one or more reduced content visibility modes. Configuring a reduced content visibility mode refers to specifying which user-selectable content is not accessible to the user in the reduced content visibility mode. The remaining user-selectable content that is accessible to the user in the reduced content visibility mode is referred to as being in the reduced subset of user-selectable content for the reduced content visibility mode. Access to the user-selectable content in the reduced content visibility mode can be controlled in various manners, such as not displaying the content on the computing device screen, blurring or scrambling the content on the device screen, locking or otherwise preventing a user from accessing the content, and so forth as discussed in more detail below.

The user-selectable content refers to content that can be selected by the user. For example, the user-selectable content can include applications or programs that can be executed in response to a user input (e.g., of an icon representing the application or program, inputting of a gesture to run the application or program, selection of a menu item to run the application or program). By way of another example, the user-selectable content can include notifications, alerts, and updates associated with applications or programs that can be executed in response to a user input. By way of another example, the user-selectable content can include individual contacts in an address book. By way of another example, the user-selectable content can include photographs, movies, songs, and so forth that can be played back by a media player on the computing device. By way of another example, the user-selectable content can include settings or preferences for the computing device 102 that a user can select (e.g., background images, wallpapers, lock screen images). By way of another example, the user-selectable content can include user selectable setting controls, such as setting controls for enabling/disabling wireless links, setting controls for security, setting controls for adding/removing accounts, and so forth.

The user-selectable content that is in a reduced subset of user-selectable content can be specified in any of a variety of different manners. In one or more implementations, the user input system 124 receives user input 504 specifying the user-selectable content that is not to be accessible in a reduced content visibility mode, and provides the user input 504 to the content visibility configuration module 112. For example, the content visibility configuration module 112 can display a list of user-selectable content and the user can specify (e.g., by touching the content in the list, by selecting buttons or check boxes associated with the content in the list, and so forth) which content is not to be accessible in the reduced content visibility mode.

Additionally or alternatively, the content that is not to be accessible in a reduced content visibility mode can be specified in other manners. For example, the content visibility configuration module 112 can obtain a default set of content that is not to be accessible in the reduced content visibility mode. This set of default content can be obtained from a local storage device (e.g., storage device 502) or a remote storage device (e.g., via the network 126 of FIG. 1).

By way of another example, the content visibility configuration module 112 can obtain a set of content that is not to be accessible in a reduced content visibility mode from a wearable device 104. E.g., the wearable device can receive user input specifying the user-selectable content that is not to be accessible in the reduced content visibility mode, and provide an indication of the specified user-selectable content to the computing device 102 (e.g., the content visibility configuration module 112).

The content visibility configuration module 112 saves configuration data identifying the content in the reduced subset of user-selectable content for a reduced content visibility mode to the storage device 502, illustrated as reduced content visibility mode configuration data 506. Additionally or alternatively, the reduced content visibility mode configuration data 506 can be stored in a remote storage device (e.g., a wearable device 104, or a storage device accessed via the network 126). The reduced content visibility mode configuration data 506 can identify the content in a reduced subset of user-selectable content in various manners. For example, the content in the reduced subset of user-selectable content can be a list or other record of the user-selectable content that is to be accessible in the reduced content visibility mode.

The content visibility control system 106 can support multiple reduced content visibility modes, each having a different reduced subset of user-selectable content. The content visibility configuration module 112 saves configuration data 506 for each of these multiple reduced content visibility modes.

The authenticator configuration module 114 configures the different authenticators supported by the content visibility control system 106. Configuring an authenticator refers to specifying what the authenticator is as well as which content visibility mode the authenticator corresponds to. Specifying what the authenticator is refers to specifying a type of the authenticator (e.g., password, fingerprint, iris scan, voice, gait or posture) as well as the data for the authenticator (e.g., what the password is, data obtained from a fingerprint scan, data obtained from an iris scan, voice data captured by a microphone, data obtained from motion sensors worn or carried by the user). The content visibility mode that a particular authenticator corresponds to is the content visibility mode that the computing device 102 operates in in response to input of that particular authenticator. Additionally or alternatively, the user can provide input to the wearable device 104 specifying what the authenticator is and/or which content visibility mode the authenticator corresponds to, and the wearable device 104 forwards that input to the authenticator configuration module 114 and/or content visibility configuration module 112.

The content visibility mode that an authenticator corresponds to can be specified in any of a variety of different manners. For example, the user can input the data for the authenticator to the authenticator configuration module 114, after which the content visibility configuration module 112 configures the corresponding reduced content visibility mode. A record of this correspondence between the authenticator and the reduced content visibility mode is maintained (e.g., in the storage device 502). This record can be maintained in any of a variety of different manners, such as storing a list or table identifying the correspondence, maintaining the reduced content visibility mode configuration data and the authenticator data in a same file, and so forth. By way of another example, the user can input the data for the authenticator to the authenticator configuration module 114 and further specify that the authenticator corresponds to the full content visibility mode.

In one or more embodiments, the authenticator configuration module 114 also optionally receives input (e.g., from the user) specifying a context of the computing device 102 corresponding to each authenticator. Different authenticators can be used for different contexts of the computing device 102, such as the current location of the computing device 102, whether a wearable device 104 is in close proximity to the computing device 102, and so forth, as discussed in more detail below.

The authenticator configuration module 114 saves the authenticator data to the storage device 502, illustrated as authenticator data 508. In situations in which different authenticators correspond to different content visibility modes, an indication of which content visibility mode the authenticator corresponds to is also saved, as part of the authenticator data 508 or separately. The authenticator data 508 can have multiple different pieces or parts, each of which includes the authenticator data corresponding to a particular content visibility mode (the authenticator data for one authenticator). Additionally or alternatively, the authenticator data 508 can be stored in a remote storage device (e.g., a wearable device 104, or a storage device accessed via the network 126). In one or more embodiments, the authenticator data 508 is encrypted before being stored, or is stored in a portion of the storage device 502 that is protected so that the authenticator data 508 is accessible only to the authenticator module 122.

In one or more embodiments, an unlock request 510 is received by the user input system 124 and provided to the content visibility determination module 116 or the authentication module 122. The unlock request 510 is a request to unlock the computing device 102, and can be an explicit request from the user, such as pushing a button on the computing device 102, inputting a gesture on a touchscreen of the computing device 102, and so forth. The user also provides an authentication input 512 to the user input system 124, which is information used to authenticate the user. The user input system 124 provides the authentication input 512 to the authentication module 122. The authentication input 512 can be any of a variety of authentication information, such as PIN, a name and password, a scanned fingerprint, a scanned face or eye, and so forth. The authentication input 512 is an authenticator. Additionally or alternatively, the user can provide the authentication input 512 to the wearable device 104, which in turn provides the received authentication input 512 to the authentication module 122.

It should be noted that the authentication input 512 can be a background input rather than an affirmative input by the user. For example, the authenticator can be data describing a user's gait, posture, and so forth measured by motion sensors worn or carried by the user.

The authentication module 122 receives the authentication input 512 and attempts to authenticate the user. The authentication module 122 submits a data request 514 to the storage device 502 for the authenticator data 508, and the storage device 502 returns the authenticator data 508 to the content visibility determination module 116. The authenticator data 508 includes authenticator data corresponding to each of multiple different content visibility modes. The authenticator data 508 includes (or is accompanied by) the indication of the content visibility mode corresponding to each piece of the authenticator data 508. The authentication module 122 authenticates the user by comparing the authentication input 512 to the authenticator data 508, and determining which (if any) of the authenticator data 508 matches (e.g., is the same as, or is within a threshold amount (e.g., 90%) of being the same as) the authentication input 512. In one or more embodiments, which authenticator data 508 to compare the authentication input 512 to is determined based on a context of the computing device 102, as discussed in more detail below.

Figure 6:
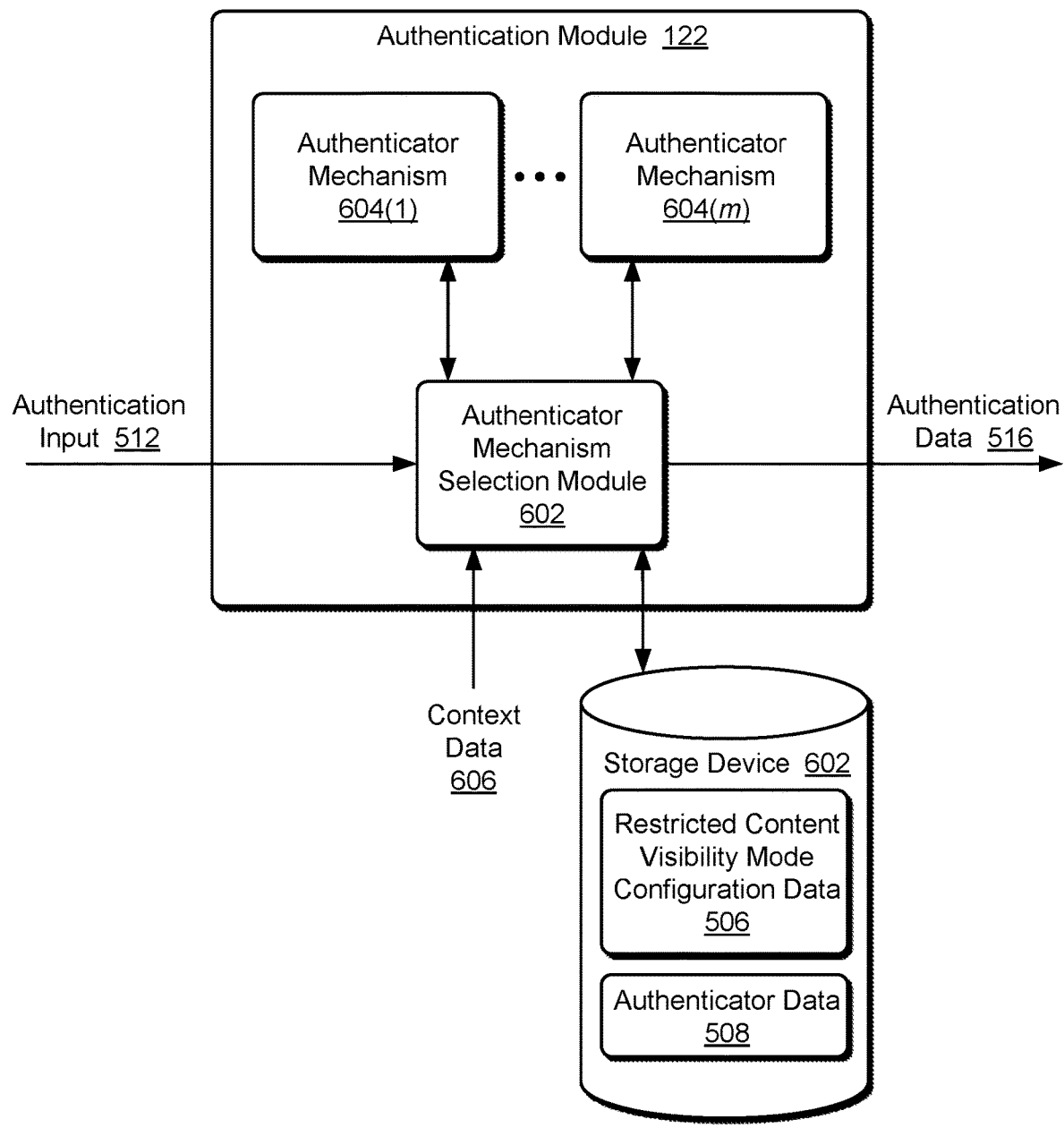
FIG. 6 illustrates an example authentication module in additional detail.

FIG. 6 illustrates an example authentication module 122 in additional detail. The authentication module 122 includes an authenticator mechanism selection module 602 and multiple (m) authenticator mechanisms 604(1), . . . , 604(m). There are various different types of authenticators, such as passwords, PINs, faces, eyes, voices, gestures, gaits or postures, and so forth. Each type of authenticator has a corresponding authenticator mechanism 604 that is used to authenticate that type of authenticator. For example, an authenticator mechanism 604 that compares input text, numbers, or other characters to the authenticator data 508 is used for password or PIN authenticators. By way of another example, an authenticator mechanism 604 that compares one or more captured images of a user's face to the authenticator data 508 is used for face authenticators. By way of another example, an authenticator mechanism 604 that compares one or more captured images of a user's iris to the authenticator data 508 is used for eye authenticators. By way of another example, an authenticator mechanism 604 that compares one or more captured audio segments of a user's speech to the authenticator data 508 is used for face authenticators. By way of another example, an authenticator mechanism 604 that compares captured motion data to the authenticator data is used for gait or posture authenticators.

In one or more embodiments, different authenticators correspond to different content visibility modes. In such embodiments, the authenticator mechanism selection module 602 receives the authentication input 512 and provides the authentication input 512 to one or more of the authenticator mechanisms 604. The authenticator mechanism selection module 602 can provide the authentication input 512 to each of the authenticator mechanisms 604, and only the authenticator mechanism 604 for the type of authenticator that is included in the authentication input 512 will be able to authenticate the input 512. Additionally or alternatively, the authenticator mechanism selection module 602 can determine the type of data in the authentication input 512 (e.g., text or numbers, an image, audio data) and selects an authenticator mechanism 604 that corresponds to that type of data. For example, the authenticator mechanism selection module 602 selects an authenticator mechanism 604 that compares input text, numbers, or other characters to the authenticator data 508 if the type of data in the authentication input 512 is text or numbers. By way of another example, the authenticator mechanism selection module 602 selects an authenticator mechanism 604 that compares one or more captured images of a user's iris, or a user's face, to the authenticator data 508 if the type of data in the authentication input 512 is an image. The authenticator mechanism selection module 602 outputs authentication data 516 indicating whether an authenticator mechanism 604 was able to authenticate the authentication input 512.

In one or more embodiments, different authenticators correspond to different contexts of the computing device 102. The context of the computing device 102 at any given time refers to the environment or setting in which the computing device 102 is situated at that time. The context of the computing device 102 can be, for example, a current location of the computing device 102, whether a wearable device 104 is in close proximity to the computing device 102, a current time, and so forth.

In one or more embodiments, the context of the computing device includes whether a wearable device 104 is in close proximity to the computing device 102. The content authenticator mechanism selection module 602 can determine whether a wearable device 104 associated with the computing device 102 is in close proximity to the computing device 102 in a variety of different manners. In one or more embodiments, a wearable device 104 being in close proximity to the computing device 102 refers to the wearable device 104 being within a threshold distance of the computing device 102. This threshold distance can vary, and is optionally user-configurable. For example, this threshold distance can range from 2 feet to 10 feet.

In one or more embodiments, the wearable device 104 is determined to be in close proximity to the computing device 102 if the wearable device 104 is within range to communicate with the computing device 102 using a particular communication protocol (e.g., Bluetooth, Bluetooth Low Energy).

Additionally or alternatively, the distance between the wearable device 104 and the computing device 102 can be determined. This distance between the wearable device 104 and the computing device 102 can be determined in a variety of different manners. For example, global positioning system (GPS) coordinates can be obtained by the wearable device 104 and provided to the content authenticator mechanism selection module 602, which also receives GPS coordinates obtained by the computing device 102. The content authenticator mechanism selection module 602 compares the two GPS coordinates and determines a distance between them.

Additionally or alternatively, rather than relying on the wearable device 104 being within a threshold distance of the computing device 102, the content authenticator mechanism selection module 602 can determine whether the wearable device 104 is in close proximity to the computing device 102 in various other manners. For example, the wearable device 104 can detect a signal such as a beacon (e.g., a nearby location beacon) and provide the location indicated in that beacon (or an identifier of the signal) to the computing device 102. The content authenticator mechanism selection module 602 determines that, if the computing device 102 detects a location beacon indicating the same location as in the signal detected by the wearable device 104 (or detects the same beacon as the wearable device 104), then the wearable device 104 is in close proximity to the computing device 102.

By way of another example, the wearable device 104 can detect a wireless signal (e.g., Wi-Fi signal) having a particular identifier (e.g., basic service set identifier (BSSID)) and signal strength (e.g., received signal strength indicator (RSSI) value). The wearable device 104 communicates that wireless signal identifier and signal strength to the computing device 102. The computing device 102 can also detect a wireless signal having a particular identifier and signal strength. The content authenticator mechanism selection module 602 determines that, if the wearable device 104 and the computing device 102 both detect a wireless signal having the same particular identifier and signal strength, then the wearable device 104 is in close proximity to the computing device 102.

By way of another example, one of the wearable device 104 and the computing device 102 can emit a sound (e.g., voice frequency or ultrasound). If the other of the wearable device 104 and the computing device detects the sound, then the wearable device 104 is in close proximity to the computing device 102.

By way of another example, both the wearable device 104 and the computing device 102 can detect various sensory data, such as sounds or motions. The wearable device 104 and the computing device 102 can share the sensory data they have detected with each other. The content authenticator mechanism selection module 602 compares the sensory data (e.g., indications of sounds or motions) that the wearable device 104 detected to the sensory data that the computing device 102 detected and determines that the wearable device 104 is in close proximity if the wearable device 104 detects the same sensory data (e.g., the same sounds, the same motions, the same location) as the computing device 102 detects.

Furthermore, in one or more embodiments the context of the computing device 102 includes whether the wearable device is being worn by a user (e.g., as opposed to just resting on a table). In such embodiments, the content authenticator mechanism selection module 602 determines whether the wearable device 104 is being worn by a user. The wearable device 104 itself can determine whether the wearable device 104 is being worn by a user, and provides an indication of that determination to the content authenticator mechanism selection module 602. The wearable device 104 can determine whether the wearable device 104 is being worn by a user in various different manners, such as sensing a heart rate, sensing a particular temperature (e.g., between 98 degrees Fahrenheit and 100 degrees Fahrenheit), capacitance detecting skin conductivity, detecting motion consistent with arm movements (e.g., in situations where the wearable device 104 is worn on the user's arm or hand), and so forth.

Additionally or alternatively, the context of the computing device 102 includes whether the wearable device 104 is authenticated to the user. In such embodiments, the user authenticates himself or herself to the wearable device 104. The user is authenticated to the wearable device 104 by comparing an authentication input (e.g., the user's name and password, the user's scanned fingerprint, a PIN) to known authentication data for the user. The wearable device 104 itself can authenticate the user and notify the content authenticator mechanism selection module 602 that the user has been authenticated to the wearable device 104. Additionally or alternatively, the wearable device 104 can provide received authentication inputs (e.g., fingerprint scan, password, voice) to the content authenticator mechanism selection module 602 and the content authenticator mechanism selection module 602 can authenticate the user.

In one or more embodiments, the context of the computing device includes a current location of the computing device 102. The current location of the computing device 102 can be represented in various different manners, such as a geographic location, whether the computing device 102 is in a public setting or a private setting, whether the computing device 102 is in a known location or a strange location, whether people other than the user are present around the computing device 102, and so forth. The current location of the computing device 102 can be obtained in various manners, such as from one or more sensors of the computing device 102, one or more sensors of the wearable device 104, combinations thereof, and so forth. These sensors can be used to detect, for example GPS coordinates, wind noise, car noise, street noise, locations at the beach, locations at the mall, and so forth.

In one or more embodiments, the current location of the computing device 102 is the geographic location of the computing device 102. In such embodiments, the authenticator mechanism selection module 602 receives context data 606 that identifies a geographic location of the computing device 102. For example, the context data 606 can be GPS coordinates received from a GPS receiver in the computing device 102 and/or the wearable device 104. By way of another example, the context data 606 can be a wireless signal (e.g., Wi-Fi signal) having a particular identifier (BSSID) and signal strength (e.g., RSSI value), which the content visibility determination module 116 can compare to known geographic locations of wireless signals having particular identifiers and signal strengths to determine the geographic location of the computing device 102.

In one or more embodiments, the current location of the computing device 102 is an indication of whether the computing device 102 is in a public setting or a private setting. The current location of the computing device 102 can be detected in various manners, such as GPS coordinates, wireless signal identifiers, and so forth. Whether the computing device 102 is in a public setting or a private setting can be detected in various manners. Different locations can be associated with private settings (e.g., home), and other locations can be associated with public settings (e.g., airports, gyms, beaches, restaurants, sports venues, etc.). For example, the user can specify (e.g., to the computing device 102 or the wearable device 104) that a particular geographic location or a particular received wireless signal is associated with a particular setting (e.g., home, airport, gym). By way of another example, the content visibility determination module 116 can access a remote service (e.g., the wearable device 104 or a server via the network 126) to obtain a set of known locations or received wireless signals associated with particular settings (e.g., airports, gyms, restaurants).

In one or more embodiments, the current location of the computing device 102 is an indication of whether the computing device 102 is in a known location or a strange location. A known location refers to a location that the computing device 102 has been at before, or a location within a threshold distance, such as 0.5 miles, of a location that the computing device 102 has been at before. A strange area refers to a location that is not known (e.g., the computing device 102 has not been at before, or a location not within a threshold distance, such as 0.5 miles, of a location that the computing device 102 has been at before). The location can be detected in various manners, such as GPS coordinates, wireless signal identifiers, and so forth.

In one or more embodiments, the current location of the computing device 102 is an indication of whether people other than the user are present around the computing device 102. Whether people are than the user are present around the computing device 102 can be detected in various manners. For example, the detection can be based on a noise level of sounds captured by a microphone (e.g., if the noise level of sounds captured by a microphone exceeds a threshold value, such as 80 decibels, then people other than the user are present around the computing device 102, otherwise people other than the user are not present around the computing device 102). By way of another example, the detection can be based on a number of different voices captured by a microphone (e.g., if a number of different voices captured by a microphone exceeds a threshold value, such as 2, then people other than the user are present around the computing device 102, otherwise people other than the user are not present around the computing device 102). By way of another example, the detection can be based on a number of different faces captured by a camera of the computing device 102 (e.g., if a number of different faces captured by the camera exceeds a threshold value, such as 2, then people other than the user are present around the computing device 102, otherwise people other than the user are not present around the computing device 102). By way of another example, the detection can be based on whether any unknown faces are detected within a threshold distance of the computing device 102 (e.g., if at least one unknown face is detected within a threshold distance of the computing device 102, such as 2 feet, then people other than the user are present around the computing device 102, otherwise people other than the user are not present around the computing device 102). By way of another example, the detection can be based on how many faces other than the user's face are detected within a threshold distance (e.g., if at least a threshold number, such as 3, faces other than the user's face are detected within a threshold distance, such as 2 feet of the computing device 102 then people other than the user are present around the computing device 102, otherwise people other than the user are not present around the computing device 102). By way of another example, the detection can be based on a number of device signatures (e.g., Wi-Fi signatures, Bluetooth signatures) that are detected by the computing device 102 (e.g., if at least a threshold number, such as 3, device signatures are detected then people other than the user are present around the computing device 102, otherwise people other than the user are not present around the computing device 102).

Although the current location of the computing device 102 and whether a wearable device 104 is in close proximity to the computing device 102 are discussed as contexts herein, various other contexts can be used by the authenticator mechanism selection module 602 to determine which authenticator to use to authenticate the user. For example, the context can include the current time, allowing different authenticators to be used for different times of the day, different days of the week, and so forth. By way of another example, the context can include the speed at which a computing device 102 is traveling, allowing different authenticators to be used for when the user is stationary and when the user is traveling in a vehicle.

Various examples of the context of the computing device 102 are discussed herein. The authenticator mechanism selection module 602 can use any one context, or any combination of these contexts, to determine which authenticator to use to authenticate the user.

The context of the computing device 102 determines the appropriate authenticator for the authentication module 122 to use to authenticate the user. This allows the user to specify one authenticator for one context, and another authenticator for another context. For example, the user can specify one password for a first context and another password for a second context. By way of another example, the user can specify a password for a first context but a fingerprint for a second context. By way of another example, the user can specify a fingerprint from his index for a first context and a fingerprint from his thumb for a second context. By way of another example, the user can specify a long voice phrase (e.g., at least 20 syllables) for a first context but a short voice phrase (e.g., less than 6 syllables) for a second context. By way of another example, the user can specify a password for a first context, a fingerprint for a second context, and a face scan for a third context, etc.

It should be noted that different authenticators can, but need not, correspond to different content visibility modes. The content visibility control system 106 can use the context of the computing device 102 to determine the authenticator to use to authenticate the user, but regardless of which authenticator is used unlock the computing device 102 to the same content visibility mode (e.g., full content visibility mode) if the user is authenticated. Additionally or alternatively, different authenticators can correspond to different content visibility modes. In such situations, the context of the computing device 102 determines the authenticator to use to authenticate the user, and thus effectively determines the content visibility mode that the computing device 102 is to operate in.

Regardless of which authenticator is used to authenticate the user, the authenticator mechanism selection module 602 outputs authentication data 516 indicating whether an authenticator mechanism 604 was able to authenticate the authentication input 512. The authenticator mechanism selection module 602 also optionally obtains an indication of the content visibility mode corresponding to the authenticator used to authenticate the user (e.g., as included in or accompanying the authenticator data 508). If such an indication is obtained, the authenticator mechanism selection module 602 includes the indication of the content visibility mode in the authentication data 516.

Returning to FIG. 5, the authentication module 122 provides authentication data 516 to the content visibility determination module 116 indicating whether the user is authenticated. The authentication data 516 also optionally includes an indication of the content visibility mode that corresponds to the authentication input 512, which is the content visibility mode the computing device 102 is to operate in. The authentication module 122 unlocks the computing device 102 in response to the user being authenticated, and does not unlock the computing device 102 in response to the user not being authenticated. If the authentication module 122 does not unlock the computing device 102 (so the computing device 102 remains locked), a lock screen is displayed to the user and optionally minimal functionality is made available, such as access to make an emergency phone call or use a camera application. However, this lock screen is separate from a reduced content visibility mode, which is enabled when the computing device 102 is unlocked.

Additionally or alternatively, the authentication input 512 can be provided as part of the unlock request 510. For example, the placing of a finger on a fingerprint sensor of the computing device 102 may serve as both the unlock request 510 and the authentication input 512. By way of another example, putting the user's face or eye in view of an image capture device of the computing device 102 may serve as both the unlock request 510 and the authentication input 512.

In one or more embodiments, the content visibility determination module 116 maintains a record of which content visibility mode the computing device 102 is currently operating in. This allows other programs or applications to query the content visibility determination module 116 to determine which content visibility mode the computing device 102 is operating in at any given time.

The content visibility determination module 116 receives, as part of the authentication data 516, an indication of which content visibility mode the computing device 102 is to operate in. In situations in which the computing device 102 is to operate in the full content visibility mode, the content visibility determination module 116 need take no actions in response to the authentication data 516. Content visibility is not restricted in the full content visibility mode, so no additional actions need to be taken by the content visibility control system 106 to restrict content visibility.

In situations in which the computing device 102 is to operate in a reduced content visibility mode, the content visibility determination module 116 submits a data request 518 to the storage device 502 for the reduced content visibility mode configuration data 506. The storage device 502 returns the reduced content visibility mode configuration data 506 to the content visibility determination module 116, which in turn generates and sends reduced visibility instructions 520 to the notification system 118, the content display system 120, the data backup system 124, and optionally one or more applications 522.

The reduced visibility instructions 520 indicate that the computing device 102 is operating in the reduced content visibility mode and further identify the reduced subset of user-selectable content. Additionally or alternatively, one or more of the systems 118, 120, 124, and/or application 522 can already be programmed (or have access to data, such as reduced content visibility mode configuration data 506 in storage device 502) with an indication of the reduced subset of user-selectable content. In such situations, the reduced visibility instructions 520 need not identify the reduced subset of user-selectable content.

Each of the notification system 118, the content display system 120, and the user input system 124 can use the reduced visibility instructions 520 as appropriate to ensure that only the content in the reduced subset of user-selectable content is accessible to the user of the computing device 102. The operation of the notification system 118, the content display system 120, and the user input system 124 based on the reduced visibility instructions 520 is discussed in more detail below.

The content display system 120 manages the display of content on the display screen of the computing device 102. In one or more embodiments, in response to receipt of the reduced visibility instructions 520, the content display system 120 ceases displaying identifiers of the user-selectable content that is not in the reduced subset of user-selectable content. The content display system 120 optionally displays user-selectable content on different pages, allowing the user to scroll or otherwise switch to different pages. This ceasing display identifiers of user-selectable content can be performed in different manners, such as not displaying particular identifiers on a page, not displaying particular pages, and so forth.

For user-selectable content that is an application or program not in the reduced subset of user-selectable content, the content display system 120 takes various actions to ensure user-selectable identifiers of the application or program are not displayed. For example, icons or widgets representing the application or program are not displayed, and menus do not display the name of the application or program. By way of another example, files that are associated with the application or program and user selection of which would cause the application or program to execute are not displayed (e.g., icons representing files containing photographs that, if selected, would cause the application or program to execute are not displayed).

For other types of user-selectable content not in the reduced subset of user-selectable content, the content display system 120 takes various actions to ensure the user-selectable content is not displayed. For example, icons representing files containing photographs (or videos, music, etc.) not in the reduced subset of user-selectable content are not displayed. By way of another example, names on a contact list that are not in the reduced subset of user-selectable content are not displayed. By way of another example images not in the reduced subset of user-selectable content are not displayed as background images, lock screen images, wallpaper, and so forth.

Additionally or alternatively, the content display system 120 can take different actions to make the user-selectable content inaccessible to the user. For example, the content display system 120 can display the user-selectable content in a manner to make them unrecognizable to user. E.g., icons or widgets representing applications, programs, or files can be blurred or scrambled, names on a contact list can be blurred or scrambled, and so forth. By way of another example, the content display system 120 can display the user-selectable content (e.g., icons or widgets representing applications or programs) that are viewable to the user but lock the content or make its content otherwise inaccessible, such as by relying on the user input system 124 to ignore any requests to access the inaccessible content.

As discussed above, the user input system 124 receives inputs of a user to the computing device 102. In response to receipt of the reduced visibility instructions 520, the user input system 124 ignores any user inputs to access user-selectable content that is not in the reduced subset of user-selectable content. Situations can arise where the user input system 124 receives user inputs referring to user-selectable content that is not in the reduced subset of user-selectable content even if no identifiers of that user-selectable content are displayed. For example, the user may input a verbal (or text) command to execute an application or program that is not in the reduced subset of user-selectable content, or the user may input a verbal (or text) command to call a contact that in the reduced subset of user-selectable content.

If the user input system 124 receives a user input to access user-selectable content that is not in the reduced subset of user-selectable content, the user input system 124 ignores the user input. For example, if the user input system 124 receives a verbal command to execute an application that is not in the reduced subset of user-selectable content, the user input system 124 identifies the application specified in the verbal command, determines that the application is not in the reduced subset of user-selectable content, and ignores the verbal command.

In one or more embodiments, content display system 120 suspends execution of user-selectable content that is an application or program not in the reduced subset of user-selectable content. Suspending execution of an application or program can be performed in various manners, such as communicating to a scheduler of the computing device 102 not to schedule the application or program for execution. Thus, user-selectable content that is an application or program not in the reduced subset of user-selectable content ceases to run on the computing device 102 while the computing device 102 is operating in the reduced content visibility mode. The content display system 120 can resume running such applications or programs (e.g., by communicating to the scheduler to resume scheduling the application or program for execution) when the computing device 102 resumes running in the full content visibility mode.

The notification system 118 provides various alerts, updates, and other notifications to the user of the computing device 102. In response to receipt of the reduced visibility instructions 520, the notification system 118 does not display, play back, or otherwise present any alerts, updates, or other notifications for applications or programs that are not in the reduced subset of user-selectable content. For example, if a telephone application is not in the reduced subset of user-selectable content, then a notification of an incoming phone call will not be displayed and no ring tone will be played. By way of another example, if a calendar application is not in the reduced subset of user-selectable content, then reminders of upcoming meetings will not be displayed on the display screen of the computing device 102.

As discussed above, the content visibility control system 106 can support multiple reduced content visibility modes, and different content can be displayed in each of these modes. Different content visibility modes correspond to different authenticators, allowing the user to provide the authenticator he or she desires in order to have the computing device 102 operate in the content visibility mode he or she desires.

Figure 7:
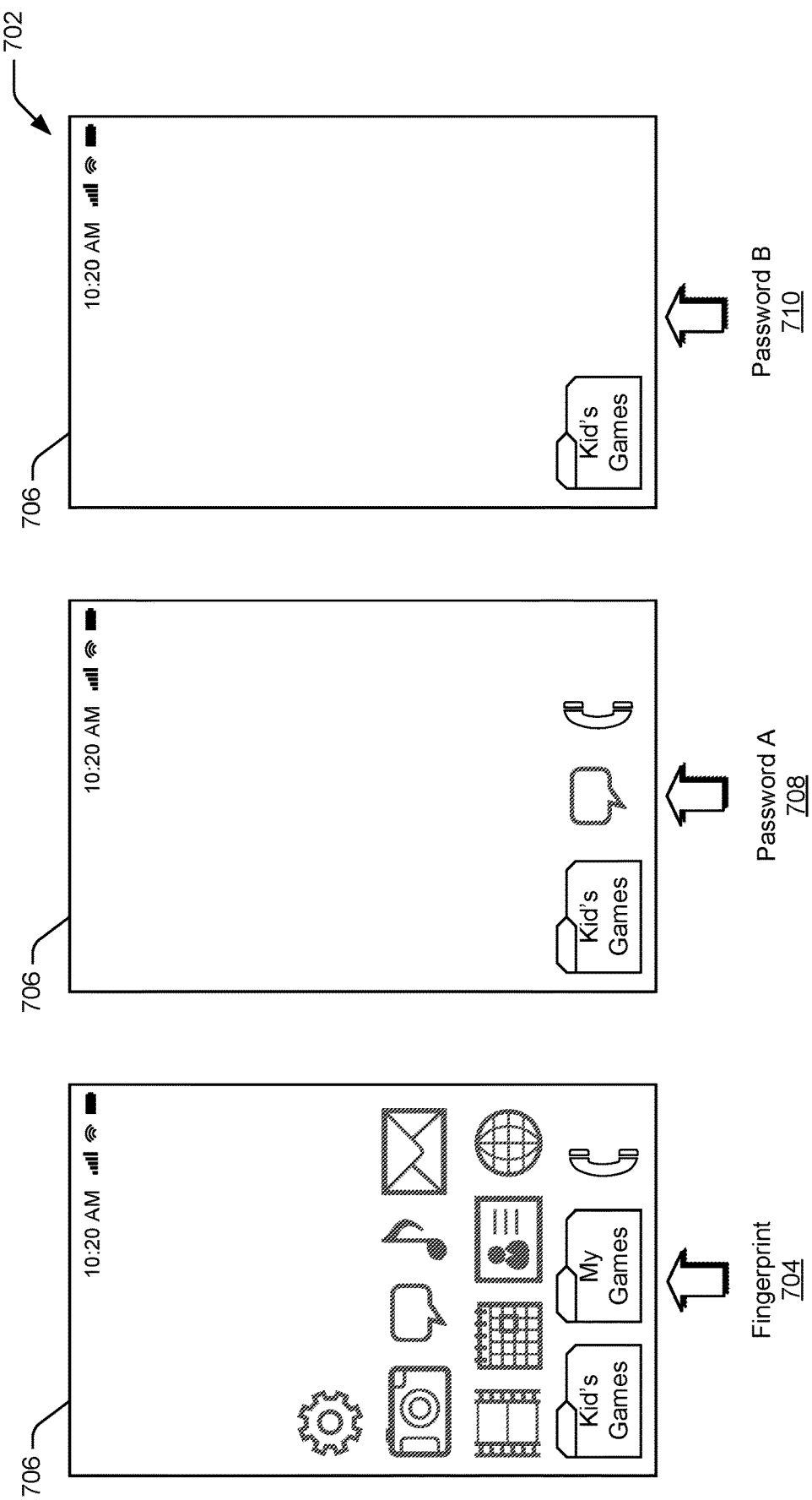
FIG. 7 illustrates an example of the operation of the techniques discussed herein.

FIG. 7 illustrates an example 702 of the operation of the techniques discussed herein. One authenticator, illustrated as fingerprint 704, is associated with the full content visibility mode. Accordingly, when the fingerprint 704 is used to authenticate the user, all user-selectable content on the computing device is visible on the display screen 706. The user-selectable content is illustrated as two folders labelled "Kid's Games" and "My Games", as well as several icons that represent applications or operating system programs that can be selected by the user for execution. For example, a gear icon represents a settings program, a camera icon represents an image capture program, a speech balloon icon represents a texting application, a music note icon represents a music playback program, an envelope icon represents an email application, a film strip icon represents a video playback program, a calendar icon represents a calendaring program, a business card icon represents a contact list program, a globe icon represents a web browser, and a telephone handset icon represents a telephone communication program.

Another authenticator, illustrated as password A 708, is associated with a first reduced content visibility mode. Accordingly, when the password A 708 is used to authenticate the user, a reduced subset of the user-selectable content is visible on the display screen 706. The user-selectable content is illustrated as a folder labelled "Kid's Games", a speech balloon icon representing a texting application, and a telephone handset icon representing a telephone communication program.

Another authenticator, illustrated as password B 710, is associated with a second reduced content visibility mode. Accordingly, when the password B 710 is used to authenticate the user, another reduced subset of the user-selectable content is visible on the display screen 706. The user-selectable content is illustrated as a folder labelled "Kid's Games", a speech balloon icon representing a texting application, and a telephone handset icon representing a telephone communication program.

Although the authenticators are illustrated as a fingerprint 704 and two passwords 708 and 710 in FIG. 7, additionally or alternatively different authenticators can be used. For example, three separate fingerprints can be used, such as a right thumb fingerprint as the fingerprint 704, a right index finger fingerprint rather than the password A 708, and a left index finger fingerprint rather than the password B 710. By way of another example, different length voice phrases can be used, such as a long voice phrase (e.g., at least 20 syllables) rather than the fingerprint 704, and a short voice phrase (e.g., less than 6 syllables) rather than the password B 710.

Returning to FIG. 5, in one or more embodiments the reduced visibility instructions 520 are also provided to one or more applications 522 on the computing device 102. This allows the application 522 to behave differently based on whether the computing device 102 is running in a reduced content visibility mode or the full content visibility mode. The application 522 can change its behavior in any of a variety of different manners. For example, the application 522 can automatically log a user into an account associated with the application 522 when in full content visibility mode (e.g., a service account allowing access to online content such as movies, songs, email), but not automatically log the user into the account associated with the application 522 when in a reduced content visibility mode. By way of another example, various features of the application 522 may be activated when in full content visibility mode (e.g., encryption functionality, virtual private network (VPN) functionality, audio recording functionality, and so forth) but not activated when in a reduced content visibility mode.

Figure 8:
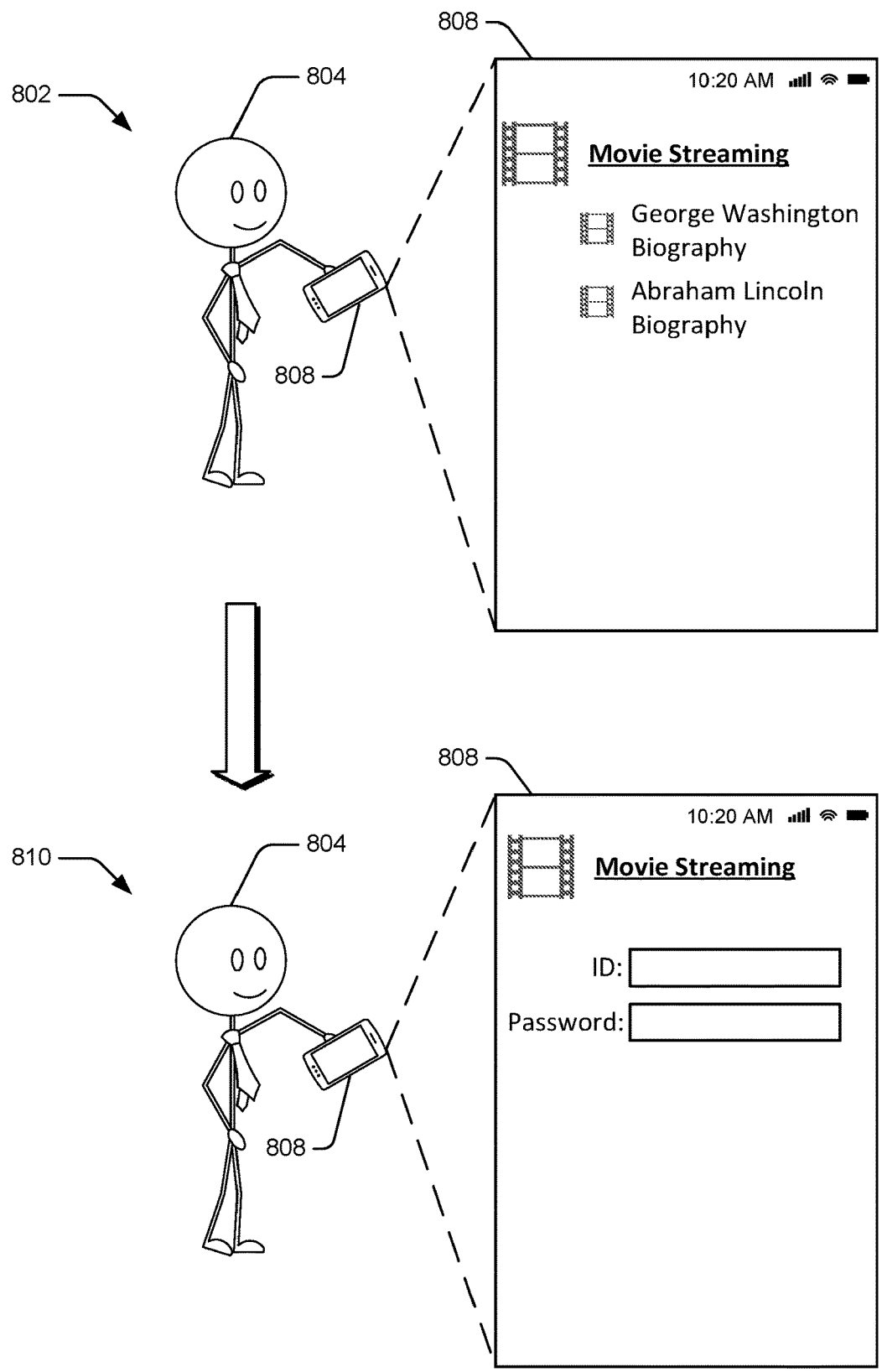
FIG. 8 illustrates an example operation of an application changing behavior.

FIG. 8 illustrates an example operation of an application changing behavior. At 802 a user 804 is illustrated. The user 804 has a computing device 806 illustrated as a smartphone. At 802 the computing device 806 is operating in the full content visibility mode. As illustrated by display screen 808, in the full content visibility mode an email application is displayed. When the user 804 selects to run the video playback application (e.g., by selecting the film strip icon illustrated in FIG. 2), the video playback application automatically logs the user 804 into his or her account using credentials for the user stored by the video playback application. Movies that the user 804 has purchased are available for viewing, illustrated as a George Washington Biography movie, and an Abraham Lincoln Biography movie.

At 810 the user is illustrated at a later time than at 802. At 810 the computing device 806 is operating in a reduced content visibility mode. As illustrated by display screen 808, in the reduced content visibility mode a login page prompting the user to enter his or her credentials to access the account associated with the video playback application is displayed.

Returning to FIG. 5, it should be noted that one or more of the various modules, systems, and storage devices in the content visibility control system 106 can be implemented by the wearable device 104 rather than the computing device 102. For example, the authentication module 122 can be implemented by the wearable device 104 so that the wearable device 104 receives the authentication input 512 and provides the authentication data 516 to the computing device 102. By way of another example, the content visibility determination module 114 can be implemented at least in part by the wearable device 104 so that the wearable device 104 determines a current location of the computing device 102, or the wearable device 104 determines whether the computing device is in a public setting or a private setting, or the wearable device 104 determines whether the wearable device 104 is in close proximity to the computing device 102 (and optionally the user is authenticated to the wearable device 104, or the user is wearing the wearable device 104, or the user is both authenticated to the wearable device 104 and wearing the wearable device 104), and so forth. By way of another example, the content visibility determination module 114 can be implemented at least in part by the wearable device 104 so that the wearable device 104 generates the reduced visibility instructions 520.

It should be noted that the varying computing device behavior for different authenticators techniques discussed herein can be configured by a user of the computing device 102. This configuration can include enabling and disabling these techniques so that they are or are not applied, respectively. This configuration can also be selection of priorities for context-specific actions (e.g., particular locations where content visibility is not reduced), whether actions based on location or proximity of the wearable device 104 to the computing device 102 are to have priority, and so forth.

Thus, as can be seen from the discussion herein, different content visibility modes can be used for the same user account (e.g., the same user login or authentication input). The user need not log into a different user account to switch from the full content visibility mode to a reduced content visibility mode, from a reduced content visibility mode to the full content visibility mode, or from one reduced content visibility mode to another reduced content visibility mode. Rather, the user can simply unlock the computing device 102 with an authenticator corresponding to the content visibility mode he or she desires or that the context of the computing device 102 dictates. The user can switch between different content visibility modes while using or remaining logged into the same user account.

In the example of FIG. 5, multiple different content visibility modes correspond to different authenticators. In one or more embodiments, different contexts are associated with different authenticators, but once the user is authenticated the content visibility mode remains the same. For example, the authentication module 122 may use a fingerprint of the user as the authenticator when a wearable device 104 is in close proximity to the computing device 102 but use a password as the authenticator when a wearable device 104 is not in close proximity to the computing device 102.

Figure 9:
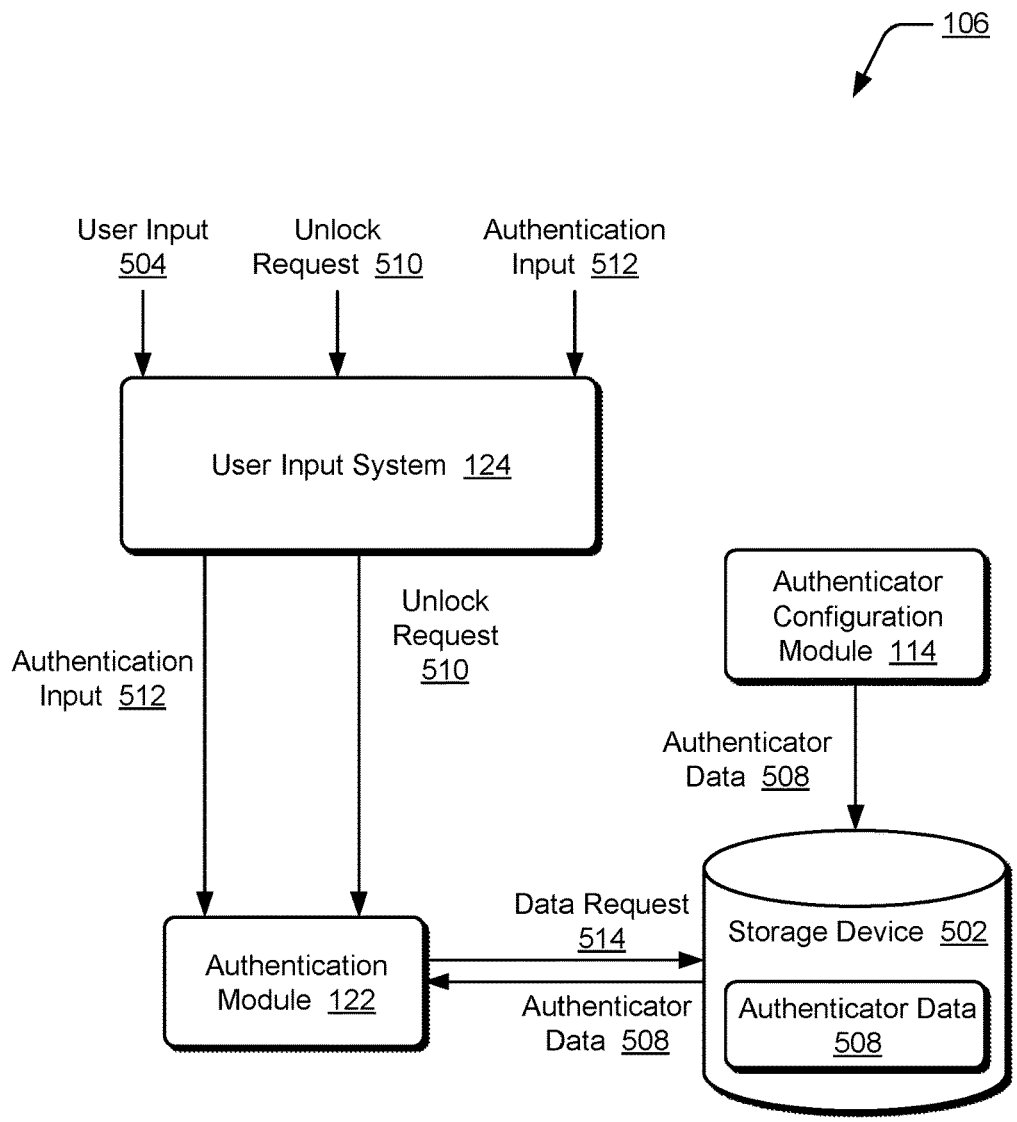
FIG. 9 illustrates another example of components of the content visibility control system in additional detail.

FIG. 9 illustrates another example of components of the content visibility control system 106 in additional detail. The example of FIG. 9 is similar to the example of FIG. 5, except that FIG. 9 supports a single content visibility mode. Accordingly, various components and instructions related to having multiple content visibility modes are excluded from the example of FIG. 9.

In the example content visibility control system 106 in FIG. 9, the content visibility control system 106 includes the authenticator configuration module 114, the authentication module 122, the user input system 124, and the storage device 502. The authenticator configuration module 114 configures the different authenticators supported by the content visibility control system 106. The authentication module 122 receives the authentication input 512 and attempts to authenticate the user. The user input system 124 receives inputs of a user to the computing device 102. The storage device 502 stores the authenticator data 508. These components operate in the same manner as discussed above, except in the example of FIG. 9 the components need not support multiple content visibility modes.

Figure 10:
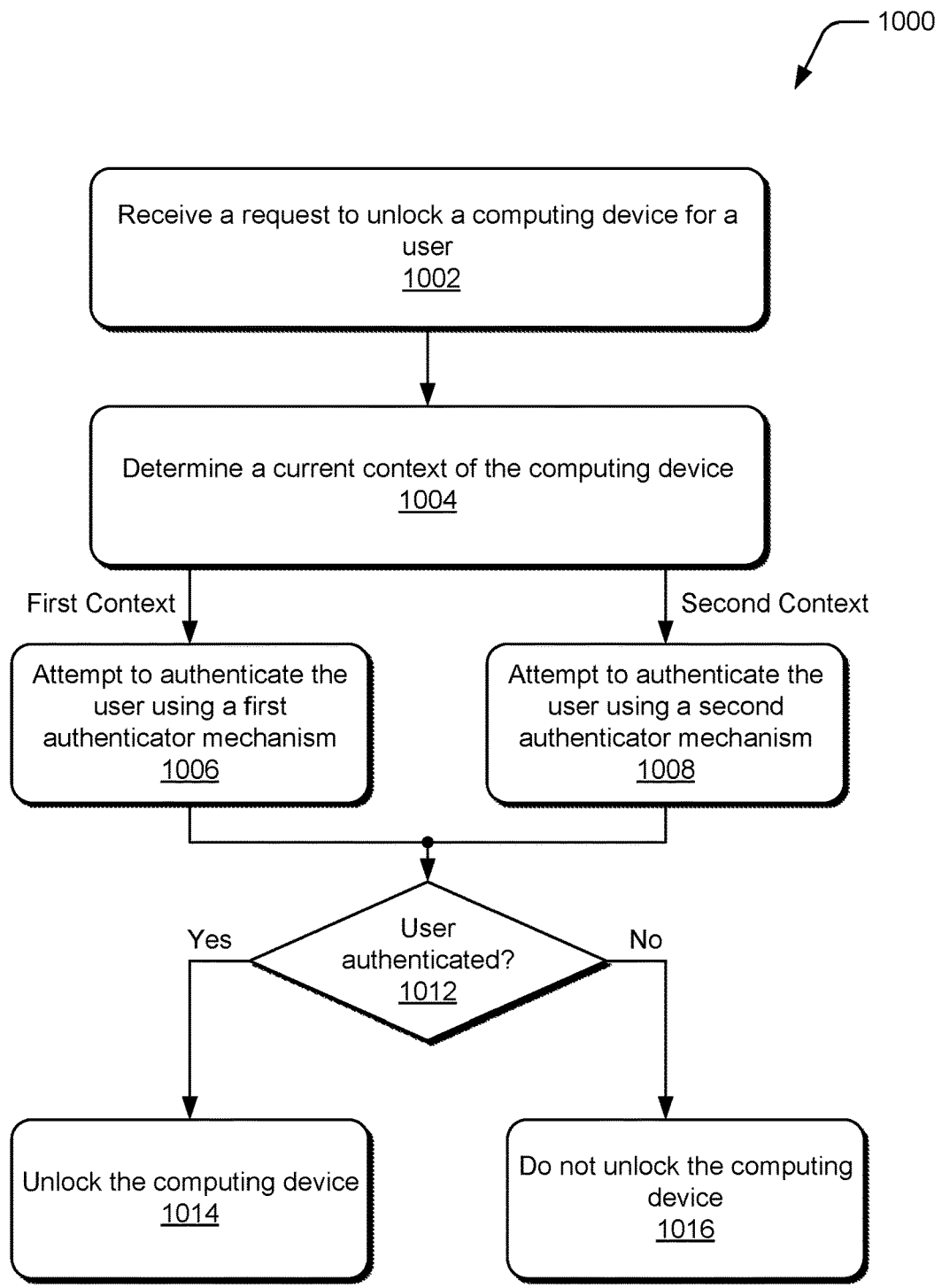
FIG. 10 illustrates an example process for implementing the techniques discussed herein in accordance with one or more embodiments.

FIG. 10 illustrates an example process 1000 for implementing the techniques discussed herein in accordance with one or more embodiments. Process 1000 is carried out by a content visibility control system, such as the content visibility control system 106 of FIG. 1, FIG. 5, or FIG. 9, and can be implemented in software, firmware, hardware, or combinations thereof. Process 1000 is shown as a set of acts and is not limited to the order shown for performing the operations of the various acts.

In process 1000, a request to unlock a computing device for a user is received (act 1002). An authenticator is also received from the user, as part of the request to unlock the computing device or alternatively separately. The authenticator can take various forms, such as a PIN, fingerprint, face scan, and so forth as discussed above.

A current context of the computing device is determined (act 1004). In one or more embodiments, the current context of the computing device includes at least one of a current location of the computing device and a proximity of a wearable device (that is associate with the user) to the computing device.

In response to the current context of the computing device being a first context, an attempt is made to authenticate the user using a first authenticator mechanism (act 1006). In response to the current context of the computing device being a second context, an attempt is made to authenticate the user using a second authenticator mechanism (act 1008).

Process 1000 proceeds based on whether the user is authenticated (act 1012). The computing device is unlocked for a particular user account in response to the user being authenticated using either the first authenticator mechanism or the second authenticator mechanism (act 1014). Regardless of which authenticator mechanism is used to authenticate the user, if the user is authenticated the computing device is unlocked for the same user account.

However, the computing device remains locked (and thus is not unlocked) in response to the user not being authenticated using either the first authenticator mechanism or the second authenticator mechanism (act 1016).

Figure 11:
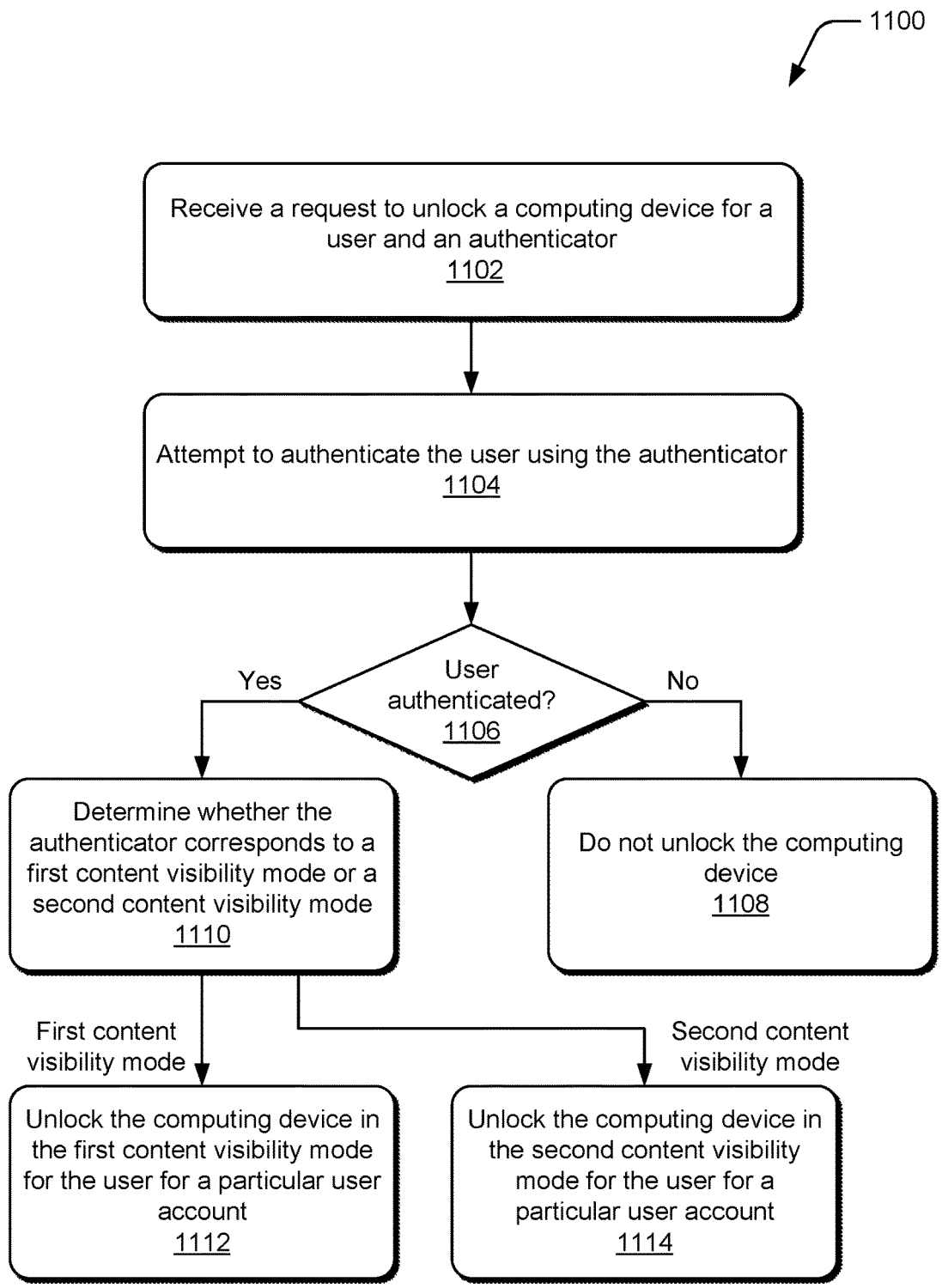
FIG. 11 illustrates another example process for implementing the techniques discussed herein in accordance with one or more embodiments.

FIG. 11 illustrates another example process 1100 for implementing the techniques discussed herein in accordance with one or more embodiments. Process 1100 is carried out by a content visibility control system, such as the content visibility control system 106 of FIG. 1 or FIG. 5, and can be implemented in software, firmware, hardware, or combinations thereof. Process 1100 is shown as a set of acts and is not limited to the order shown for performing the operations of the various acts.

In process 1100, a request to unlock a computing device for a user is received (act 1102). An authenticator is also received from the user, as part of the request to unlock the computing device or alternatively separately. The authenticator can take various forms, such as a PIN, fingerprint, face scan, and so forth as discussed above.

An attempt is made to authenticate the user using the authenticator (act 1104). The attempt can be made using various different authenticator mechanisms based on the type of authenticator, as discussed above.

Process 1100 proceeds based on whether the user is authenticated (act 1106). If the computing device is not authenticated, the computing device remains locked (and thus is not unlocked).

However, if the user is authenticated, then a determination is made whether the authenticator corresponds to a first content visibility mode or a second content visibility mode (act 1110). The first content visibility mode can be, for example, a full content visibility mode or a reduced content visibility mode. The second content visibility mode can be, for example, a reduced content visibility mode.

In response to the authenticator corresponding to the first full content visibility mode, the computing device is unlocked for the user for a particular user account in the first content visibility mode (act 1112). Thus, the computing device is unlocked for the user for the particular user account in the first content visibility mode in response to the user being authenticated using the authenticator and the authenticator corresponding to the first content visibility mode.

In response to the authenticator corresponding to the second full content visibility mode, the computing device is unlocked for the user for a particular user account in the second content visibility mode (act 1114). Thus, the computing device is unlocked for the user for the particular user account in the second content visibility mode in response to the user being authenticated using the authenticator and the authenticator corresponding to the second content visibility mode.

It should be noted that, regardless of which content visibility mode the computing device is operating in in acts 1112 and 1114, the computing device is unlocked for the same user account. The user account is the same, although the content visibility mode is different.

Figure 12:
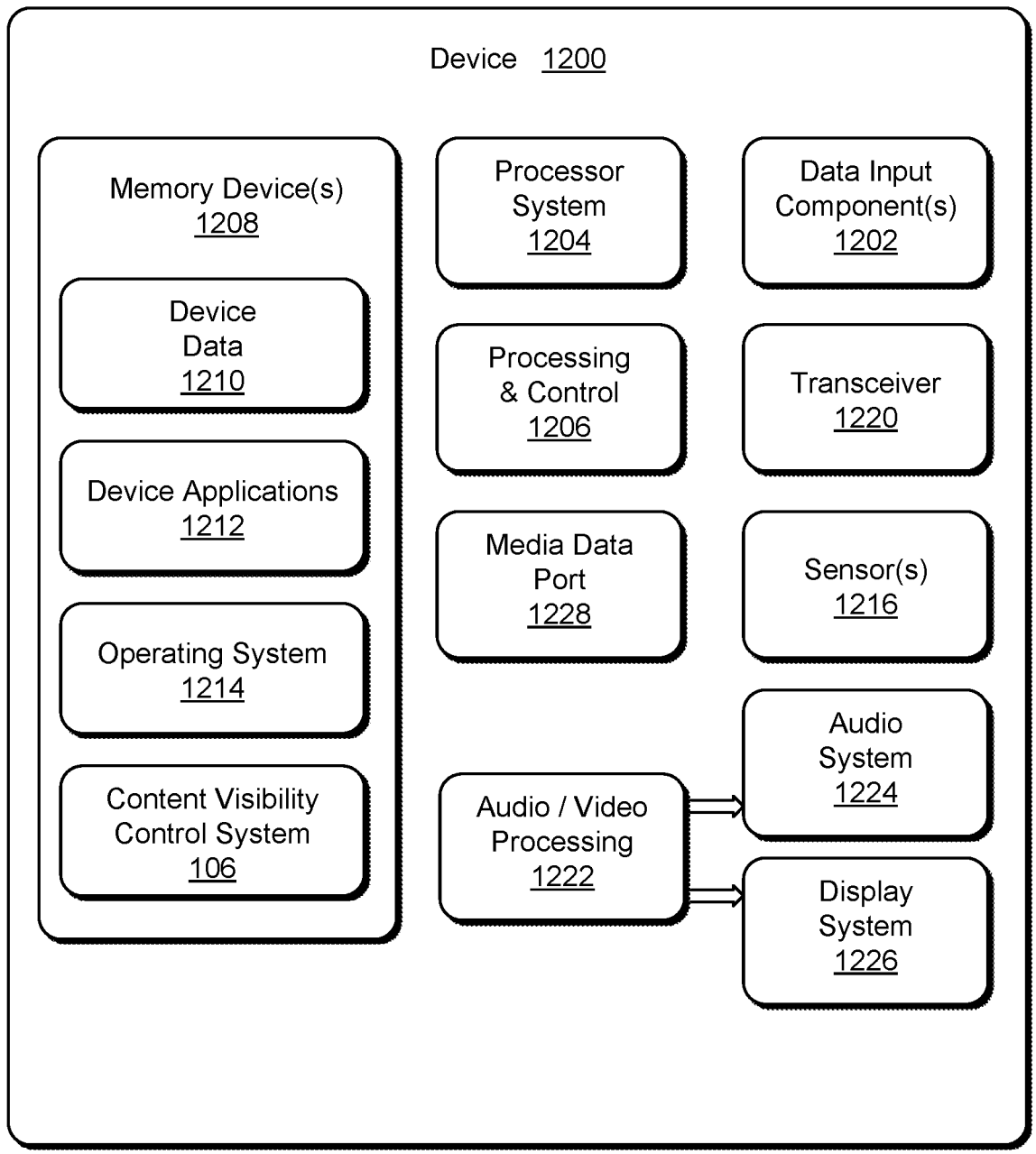
FIG. 12 illustrates various components of an example electronic device that can be implemented as a computing device as described herein.

FIG. 12 illustrates various components of an example electronic device 1200 that can be implemented as a computing device or a wearable device as described with reference to any of the previous FIGS. 1-11. The device 1200 may be implemented as any one or combination of a fixed or mobile device in any form of a consumer, computer, portable, user, communication, phone, navigation, gaming, messaging, Web browsing, paging, media playback, or other type of electronic device.

The electronic device 1200 can include one or more data input components 1202 via which any type of data, media content, or inputs can be received such as user-selectable inputs, messages, music, television content, recorded video content, and any other type of audio, video, or image data received from any content or data source. The data input components 1202 may include various data input ports such as universal serial bus ports, coaxial cable ports, and other serial or parallel connectors (including internal connectors)

for flash memory, DVDs, compact discs, and the like. These data input ports may be used to couple the electronic device to components, peripherals, or accessories such as keyboards, microphones, or cameras. The data input components 1202 may also include various other input components such as microphones, touch sensors, keyboards, cameras or other image capture components, and so forth.

The electronic device 1200 of this example includes a processor system 1204 (e.g., any of microprocessors, controllers, and the like) or a processor and memory system (e.g., implemented in a system on a chip), which processes computer executable instructions to control operation of the device 1200. A processor system 1204 may be implemented at least partially in hardware that can include components of an integrated circuit or on-chip system, an application specific integrated circuit, a field programmable gate array, a complex programmable logic device, and other implementations in silicon or other hardware. Alternatively or in addition, the electronic device 1200 can be implemented with any one or combination of software, hardware, firmware, or fixed logic circuitry implemented in connection with processing and control circuits that are generally identified at 1206. Although not shown, the electronic device 1200 can include a system bus or data transfer system that couples the various components within the device 1200. A system bus can include any one or combination of different bus structures such as a memory bus or memory controller, a peripheral bus, a universal serial bus, or a processor or local bus that utilizes any of a variety of bus architectures.

The electronic device 1200 also includes one or more memory devices 1208 that enable data storage such as random access memory, nonvolatile memory (e.g., read only memory, flash memory, erasable programmable read only memory, electrically erasable programmable read only memory, etc.), and a disk storage device. A memory device 1208 provides data storage mechanisms to store the device data 1210, other types of information or data (e.g., data backed up from other devices), and various device applications 1212 (e.g., software applications). For example, an operating system 1214 can be maintained as software instructions with a memory device and executed by the processor system 1204.

In one or more embodiments the electronic device 1200 includes a content visibility control system 106, described above. Although represented as a software implementation, the content visibility control system 106 may be implemented as any form of a control application, software application, signal processing and control module, firmware that is installed on the device 1200, a hardware implementation of the system 106, and so on.

It should be noted that in some situations, at least some of the processing performed by the electronic device 1200 can be offloaded to a distributed system, such as over a "cloud" service. Such a cloud service includes one or more electronic devices to implement at least some of processing discussed herein as being performed by the electronic device 1200.

The electronic device 1200 also optionally includes one or more sensors 1216. These sensors 1216 can be any of a variety of different types of sensors discussed above. For example, sensors 1216 can be sensors detecting location or context of the electronic device 1200, imaging sensors (e.g., cameras or other image capture devices), sound sensors (e.g., microphones), and so forth.

Moreover, in one or more embodiments various techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The computer-readable storage medium can be, for example, memory devices 1208.

The electronic device 1200 also includes a transceiver 1220 that supports wireless and/or wired communication with other devices or services allowing data and control information to be sent as well as received by the device 1200. The wireless and/or wired communication can be supported using any of a variety of different public or proprietary communication networks or protocols such as cellular networks (e.g., third generation networks, fourth generation networks such as LTE networks), wireless local area networks such as Wi-Fi networks, Bluetooth protocols, NFC protocols, USB protocols, and so forth.

The electronic device 1200 can also include an audio or video processing system 1222 that processes audio data or passes through the audio and video data to an audio system 1224 or to a display system 1226. The audio system or the display system may include any devices that process, display, or otherwise render audio, video, display, or image data. Display data and audio signals can be communicated to an audio component or to a display component via a radio frequency link, S-video link, high definition multimedia interface (HDMI), composite video link, component video link, digital video interface, analog audio connection, or other similar communication link, such as media data port 1228. In implementations the audio system or the display system are external components to the electronic device. Alternatively or in addition, the display system can be an integrated component of the example electronic device, such as part of an integrated touch interface. For example, the display system 1226 can be configured as any suitable type of display screen, such as an organic light-emitting diode (OLED) display, active matrix OLED display, liquid crystal display (LCD), in-plane shifting LCD, projector, and so forth.

Although embodiments of techniques for implementing varying computing device behavior for different authenticators have been described in language specific to features or methods, the subject of the appended claims is not necessarily limited to the specific features or methods described. Rather, the specific features and methods are disclosed as example implementations of techniques for varying computing device behavior for different authenticators.

What is claimed is:

1. A method implemented in a computing device, the method comprising:
   receiving a request to unlock the computing device for a user;
   determining a current context of the computing device, the current context of the computing device indicating whether a wearable device is within a proximity of the computing device;
   attempting to authenticate the user using a first authenticator mechanism in response to the current context of the computing device indicating that the wearable device is within the proximity of the computing device;
operating in a full content visibility mode in response to the user being authenticated using the first authenticator mechanism, the full content visibility mode including applications of the computing device, the operating in the full content visibility mode including displaying notifications associated with the applications on a display screen of the computing device;
attempting to authenticate the user using a second authenticator mechanism in response to the current context of the computing device indicating that the wearable device is not within the proximity of the computing device; and
operating in a reduced content visibility mode in response to the user being authenticated using the second authenticator mechanism, the reduced content visibility mode including a reduced subset of the applications, the operating in the reduced content visibility mode including ceasing displaying notifications associated with one or more of the applications that are not in the reduced subset of the applications.

2. The method of claim 1, wherein:
the operating in the full content visibility mode includes displaying icons of the applications on the display screen of the computing device, the icons being selectable to access content associated with the applications; and
the operating in the reduced content visibility mode including ceasing displaying the icons of the one or more applications that are not in the reduced subset and making the content associated with the one or more applications that are not in the reduced subset inaccessible to the user.

3. The method of claim 2, the operating in the reduced content visibility mode including ignoring user inputs to access the content of the one or more applications that are not in the reduced subset of the applications.

4. The method of claim 1, the first authenticator mechanism and the second authenticator mechanism being a same authenticator mechanism.

5. The method of claim 1, the first authenticator mechanism being a different authenticator mechanism than the second authenticator mechanism.

6. The method of claim 1, the operating in the full content visibility mode including automatically logging the user into an account associated with an application responsive to receiving a user input to run the application.

7. The method of claim 6, the operating in the reduced content visibility mode including displaying a login page for the application prompting the user to enter login credentials in order to log in to the account associated with the application responsive to receiving the user input to run the application.

8. The method of claim 1, further comprising detecting whether the wearable device is within the proximity of the computing device based on a determination as to whether the wearable device is within a user-configurable threshold distance of the computing device.

9. The method of claim 1, further comprising detecting that the wearable device is within the proximity of the computing device by determining that the wearable device and the computing device both detect a wireless network signal having a same identifier and a same signal strength.

10. The method of claim 1, further comprising detecting that the wearable device is within the proximity of the computing device by determining that the wearable device and the computing device detect a location beacon indicating a same location.

11. The method of claim 1, further comprising detecting that the wearable device is within the proximity of the computing device by determining that a sound emitted by the computing device is detected by the wearable device.

12. The method of claim 1, wherein:
the first authenticator mechanism does not unlock the computing device responsive to the current context of the computing device indicating that the wearable device is not within the proximity of the computing device; and
the second authenticator mechanism does not unlock the computing device responsive to the current context of the computing device indicating that the wearable device is within the proximity of the computing device.

13. The method of claim 1, wherein:
the full content visibility mode includes a contacts list, the operating in the full content visibility mode includes displaying contacts of the contacts list on the display screen of the computing device, the contacts being selectable to display contact information of the contacts; and
the reduced visibility mode includes a reduced subset of the contacts list, the operating in the reduced content visibility mode including ceasing displaying the contacts that are not in the reduced subset of the contacts list and making the contact information associated with the contacts that are not in the reduced subset of the contacts list inaccessible to the user.

14. The method of claim 13, the operating in the reduced content visibility mode further including preventing communication with the contacts that are not in the reduced subset of the contacts list.

15. A computing device comprising:
a display screen;
a storage device to store authenticator data identifying data to authenticate a user; and
a processor system that implements a content visibility control system to:
receive a request to unlock the computing device for the user;
determine a current context of the computing device, the current context of the computing device indicating a number of users other than the user that are present at a current location of the computing device;
attempt to authenticate the user using a first authenticator mechanism and the authenticator data in response to the current context of the computing device indicating that the number of users other than the user that are present at the current location of the computing device is less than a threshold number;
operate in a full content visibility mode in response to the user being authenticated using the first authenticator mechanism, the full content visibility mode including applications of the computing device, to operate in the full content visibility mode includes displaying notifications associated with the applications on the display screen of the computing device;
attempt to authenticate the user using a second authenticator mechanism and the authenticator data in response to the current context of the computing device indicating that the number of users other than the user that are present at the computing device is at least the threshold number; and operate in a reduced content visibility mode in response to the user being authenticated using the second authenticator mechanism, the reduced content visibility mode including a reduced subset of the applications, to operate in the reduced content visibility mode includes ceasing displaying notifications associated with one or more of the applications that are not in the reduced subset of the applications.

16. The computing device of claim 15, wherein:
to operate in the full content visibility mode includes displaying icons of the applications on the display screen of the computing device, the icons being selectable to access content associated with the applications; and
to operate in the reduced content visibility mode includes ceasing displaying the icons of the one or more applications that are not in the reduced subset and making the content associated with the one or more applications that are not in the reduced subset inaccessible to the user.

17. The computing device of claim 16, the operating in the reduced content visibility mode including ignoring user inputs to access the content of the one or more applications that are not in the reduced subset of the applications.

18. The computing device of claim 15, the first authenticator mechanism being a different authenticator mechanism than the second authenticator mechanism.

19. The computing device of claim 15, wherein the content visibility control system is further configured to detect the number of users other than the user that are present at the current location of the computing device based on a number of different voices captured by a microphone of the computing device.

20. A method implemented in a computing device, the method comprising:
receiving a request to unlock the computing device for a user;
determining a current context of the computing device, the current context of the computing device indicating whether a wearable device is within a proximity of the computing device a number of users other than the user that are present at a current location of the computing device;
attempting to authenticate the user using a first authenticator mechanism in response to the current context of the computing device indicating that the wearable device is within the proximity of the computing device number of users other than the user that are present at the current location of the computing device is less than a threshold number;
operating in a full content visibility mode in response to the user being authenticated using the first authenticator mechanism, the full content visibility mode including applications of the computing device, the operating in the full content visibility mode including displaying notifications associated with the applications on a display screen of the computing device;
attempting to authenticate the user using a second authenticator mechanism in response to the current context of the computing device indicating that the wearable device is not within the proximity of the computing device number of users other than the user that are present at the computing device is at least the threshold number; and
operating in a reduced content visibility mode in response to the user being authenticated using the second authenticator mechanism, the reduced content visibility mode including a reduced subset of the applications, the operating in the reduced content visibility mode including ceasing displaying notifications associated with one or more of the applications that are not in the reduced subset of the applications.

* * * * *